March 9, 1954  F. O. WALLENE  2,671,859
POWER CONTROL APPARATUS
Filed Aug. 8, 1952  7 Sheets-Sheet 7
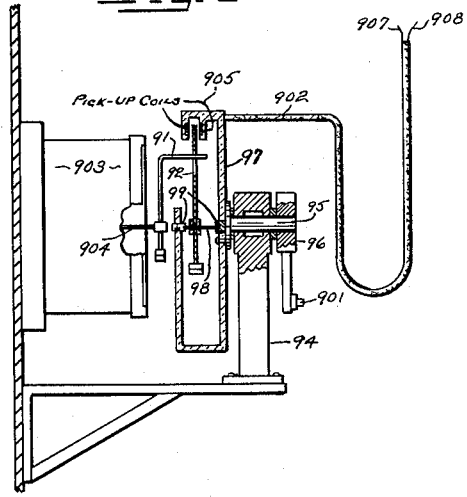
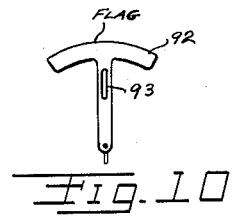
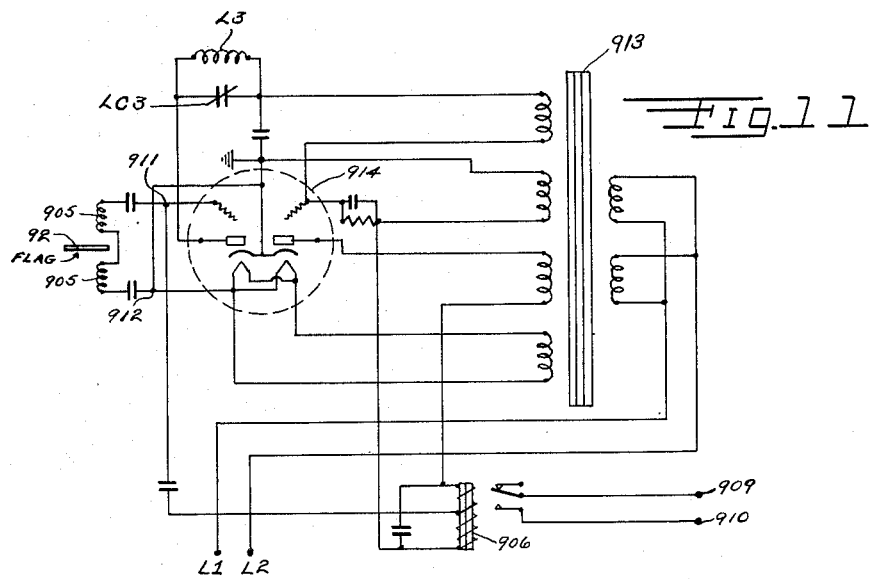
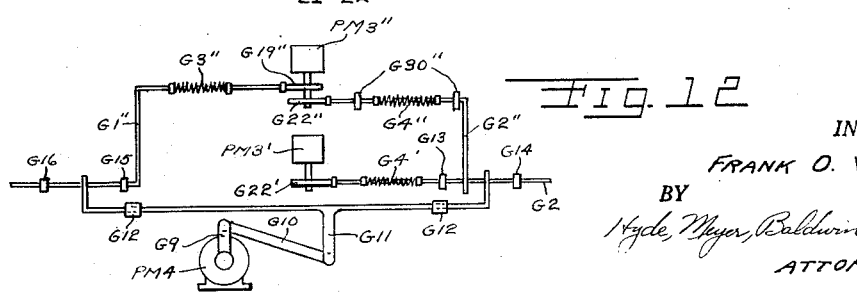
INVENTOR.
FRANK O. WALLENE
BY
Hyde, Meyer, Baldwin & Doan
ATTORNEYS Patented Mar. 9, 1954

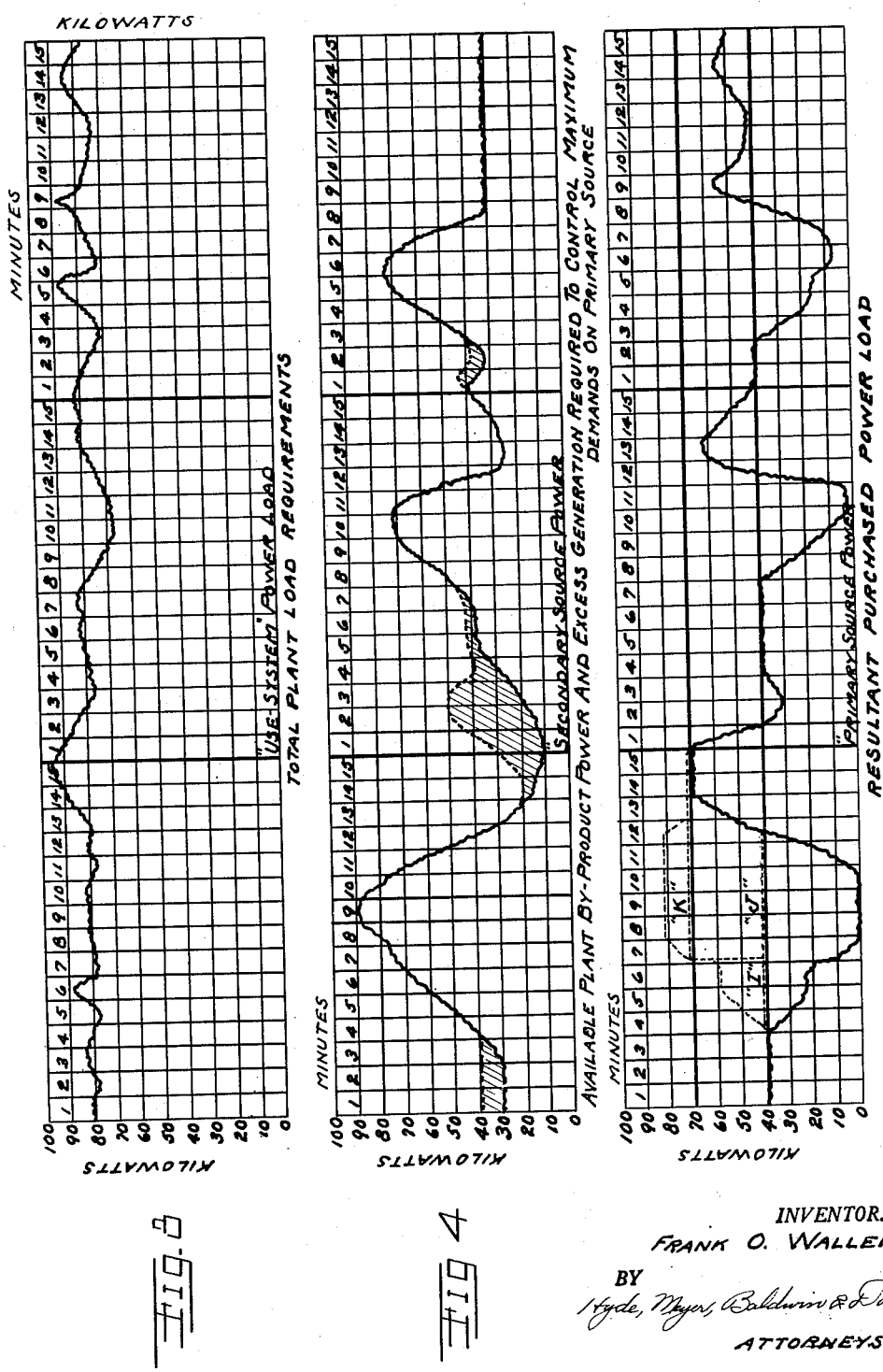

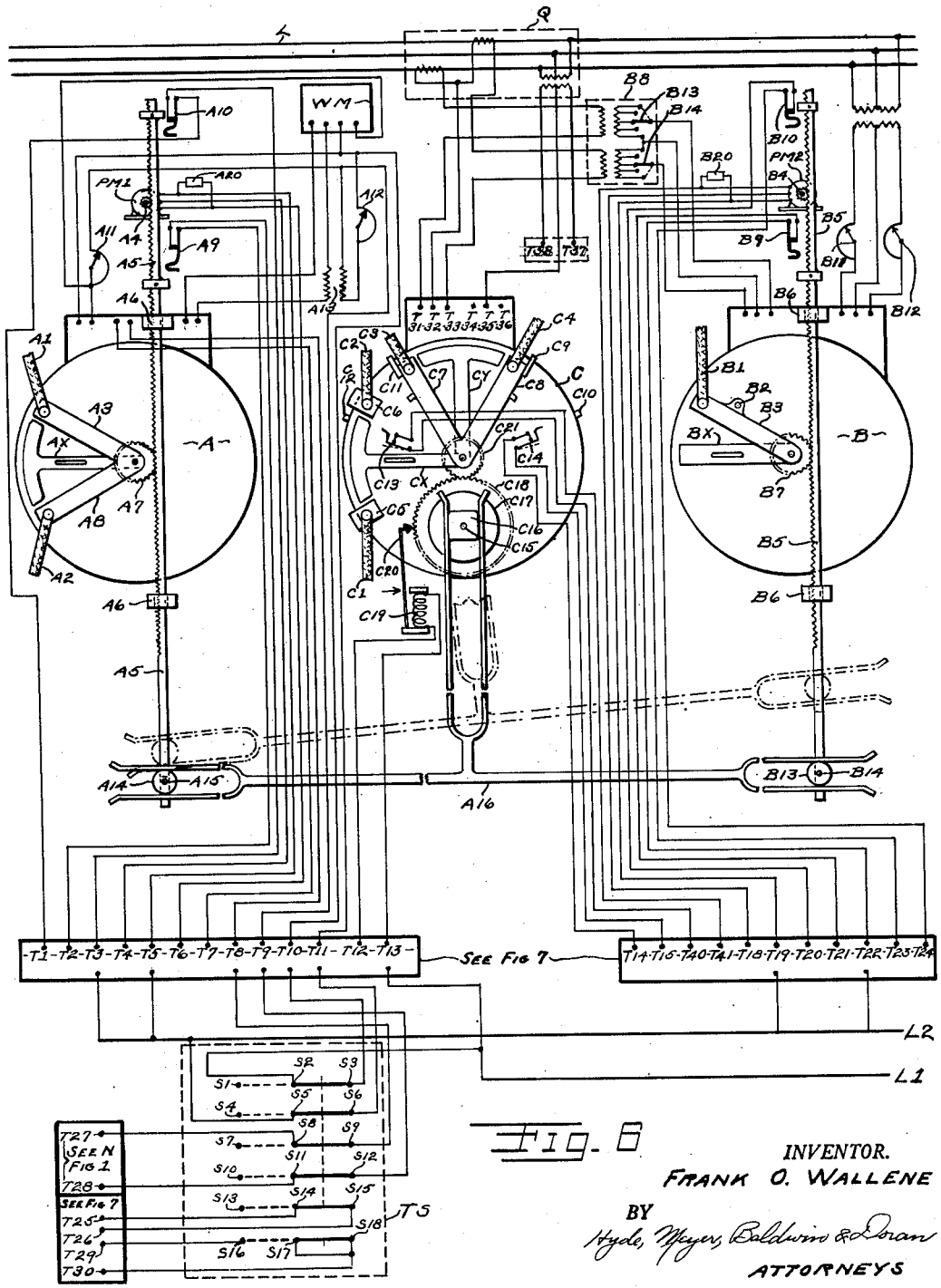

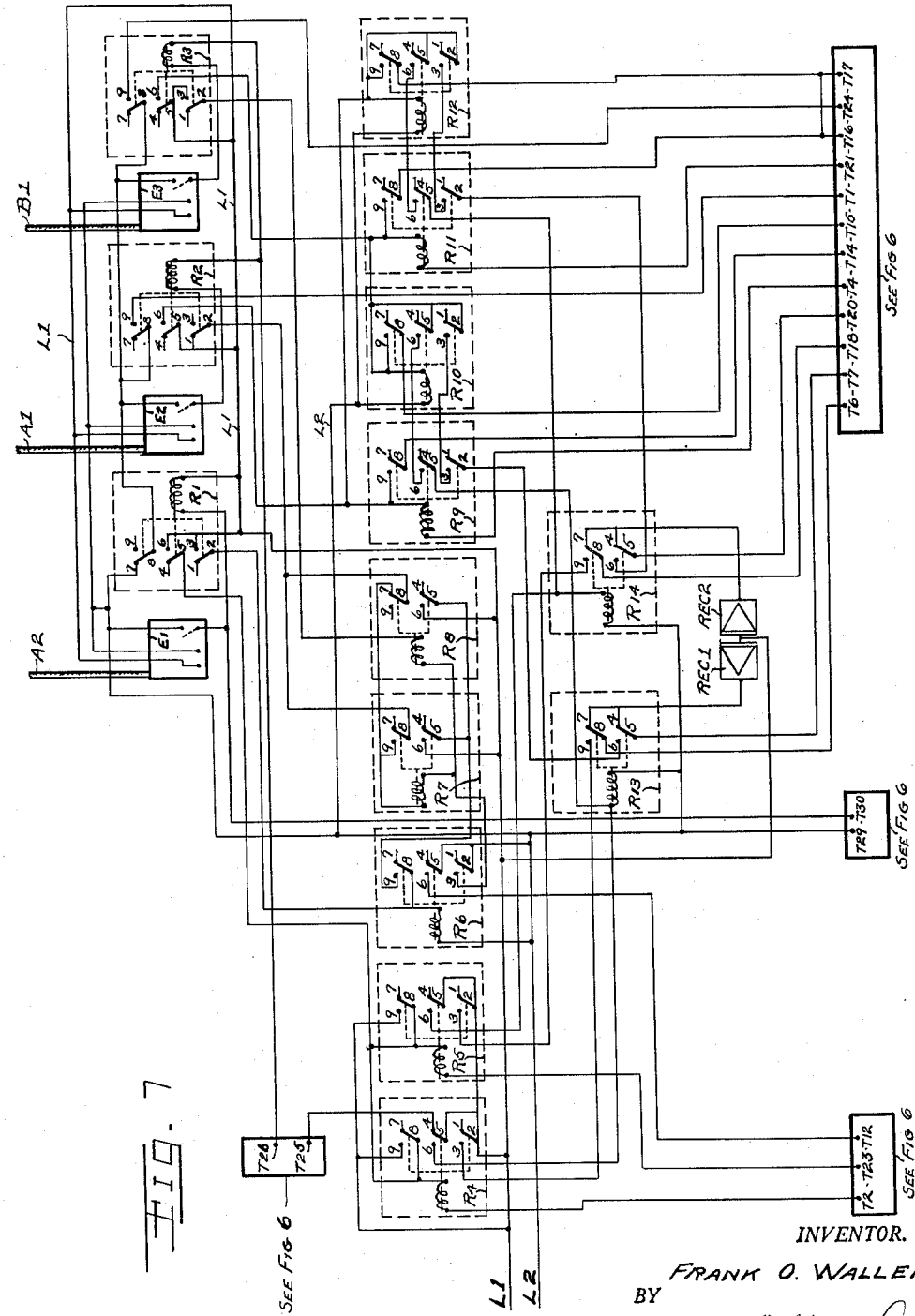

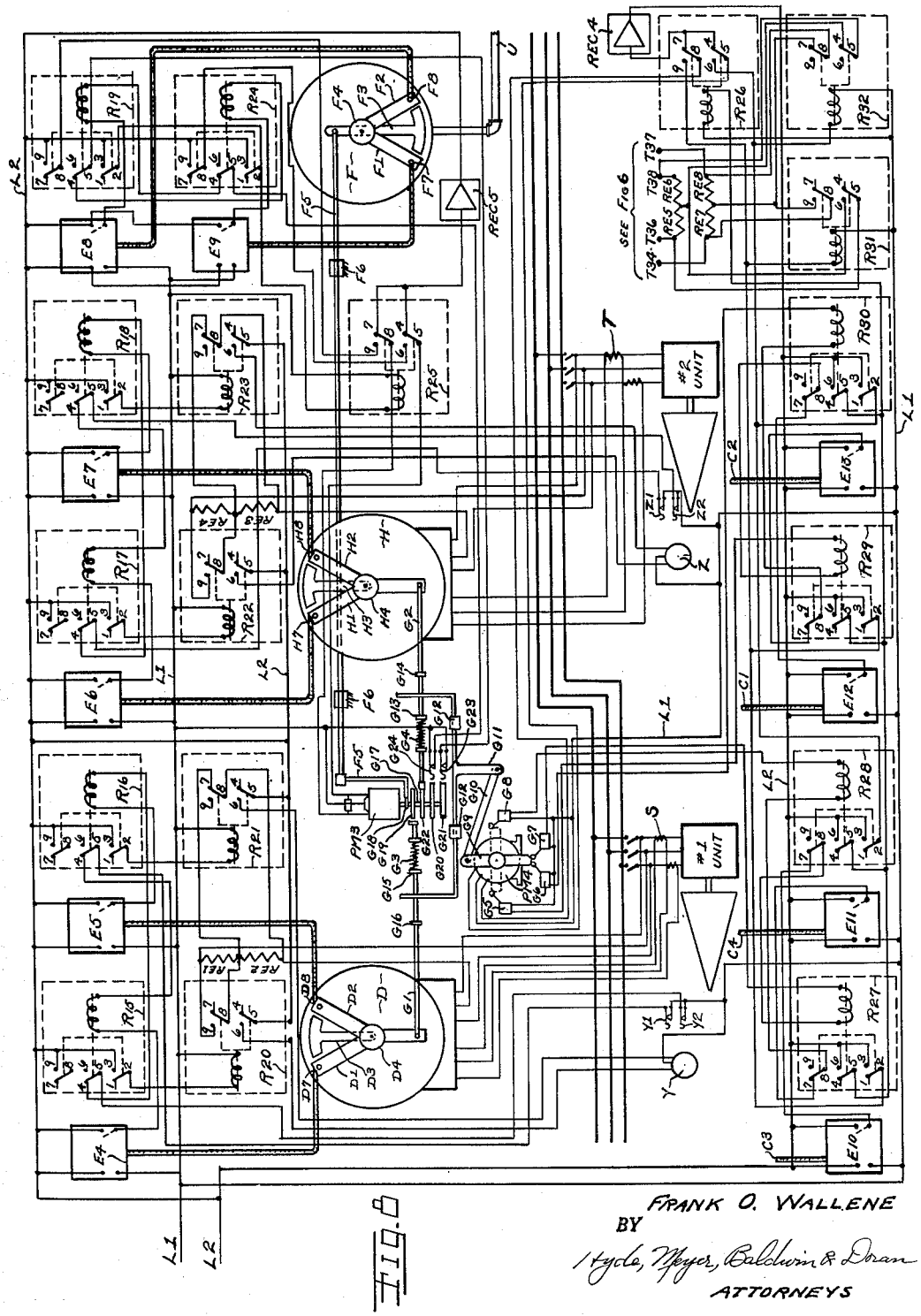

2,671,859

UNITED STATES PATENT OFFICE 2,671,859

POWER CONTROL APPARATUS

Frank O. Wallene, Cleveland, Ohio

Application August 8, 1952, Serial No. 303,366

37 Claims. (Cl. 290—4)

This invention relates to improvements in power control method and apparatus and more particularly to a power control method and apparatus for confining the total electrical draft upon a primary electrical source below a predetermined kilowatt or kilovolt-ampere demand load over a given demand billing period.

This application is a continuation-in-part of my copending United States patent application entitled "Power Control Method and Apparatus," Serial No. 117,704, filed September 24, 1949, and now abandoned.

One of the objects of the present invention is to provide apparatus or method for confining the total electric draft upon a primary source of electric power below a given or predetermined average kw. or kva. demand load over a given time interval by causing a secondary source to supply electric power to the load.

Another object of the present invention is to provide power control method or apparatus responsive to certain economy factors that have an influence on the over-all cost of operation.

Another object of the present invention is to supply electric power to a load or "electric power use-system" and to supply heat to a "heat energy use-system" at the lowest overall cost when a portion of the electric power is purchased from a primary source charging on an average kw. or kva. demand load basis over a given demand load billing period, by keeping the draft on the primary source below a predetermined average kw. or kva. demand load over the given demand load billing period and by keeping the draft on the primary source within predetermined minimum and/or maximum swing draft limits by causing a secondary electric power source to provide power to said "electric power use-system" wherein said secondary source may have one or more of the following features in combination: (1) heat energy extracted at one or more different pressure levels to meet demands of the "heat energy use-system," (2) the secondary source receiving energy from by-product fuel or waste heat, (3) the secondary source consisting of one or more electric power generating units having different efficiencies with either concurrent or sequential loading giving best results, (4) full utilization generally being made of "by-product electric power" being generated by the extracted heat energy and by-product fuel before power is purchased, and (5) other features brought out in more detail hereinafter.

Other features of this invention reside in the arrangement and design of the parts for carrying out their appropriate functions.

Other objects and advantages of this invention will be apparent from the accompanying drawings and description and the essential features will be set forth in the appended claims.

In the drawings,

Fig. 3 is a graph of the fluctuating manufacturing plant load that must be met by the primary or secondary electric power source or a combination of both;

Fig. 4 is a graph portraying the secondary source cheaply produced "by-product power" and also "excess power" (shaded area) within the industrial plant with said "excess power" required to control peak power demand on the primary source or public utilities by furnishing electric power needs of the plant load (Fig. 3);

Fig. 5 is a graph showing the resultant purchased power from the public utility or primary source to meet the load requirements (Fig. 3) when the secondary source (Fig. 4) is connected in parallel with the primary source to the load with the electrical output of the secondary source automatically controlled by means of the present invention;

Fig. 6 is the timing component of the present invention but flags CX and CY are each shown between their respective pick-up coils for clarity (they are actually mounted on a common shaft and rotate together with a larger angular spread between them than that shown in Fig. 6);

Fig. 7 is the control wiring for the timing component with its return to zero control and said control wiring is connected electrically to the structure shown in Fig. 6 by the corresponding terminal T connections and pick-up coil A1, A2 and B1 connections in Figs. 6 and 7;

Figure 1:
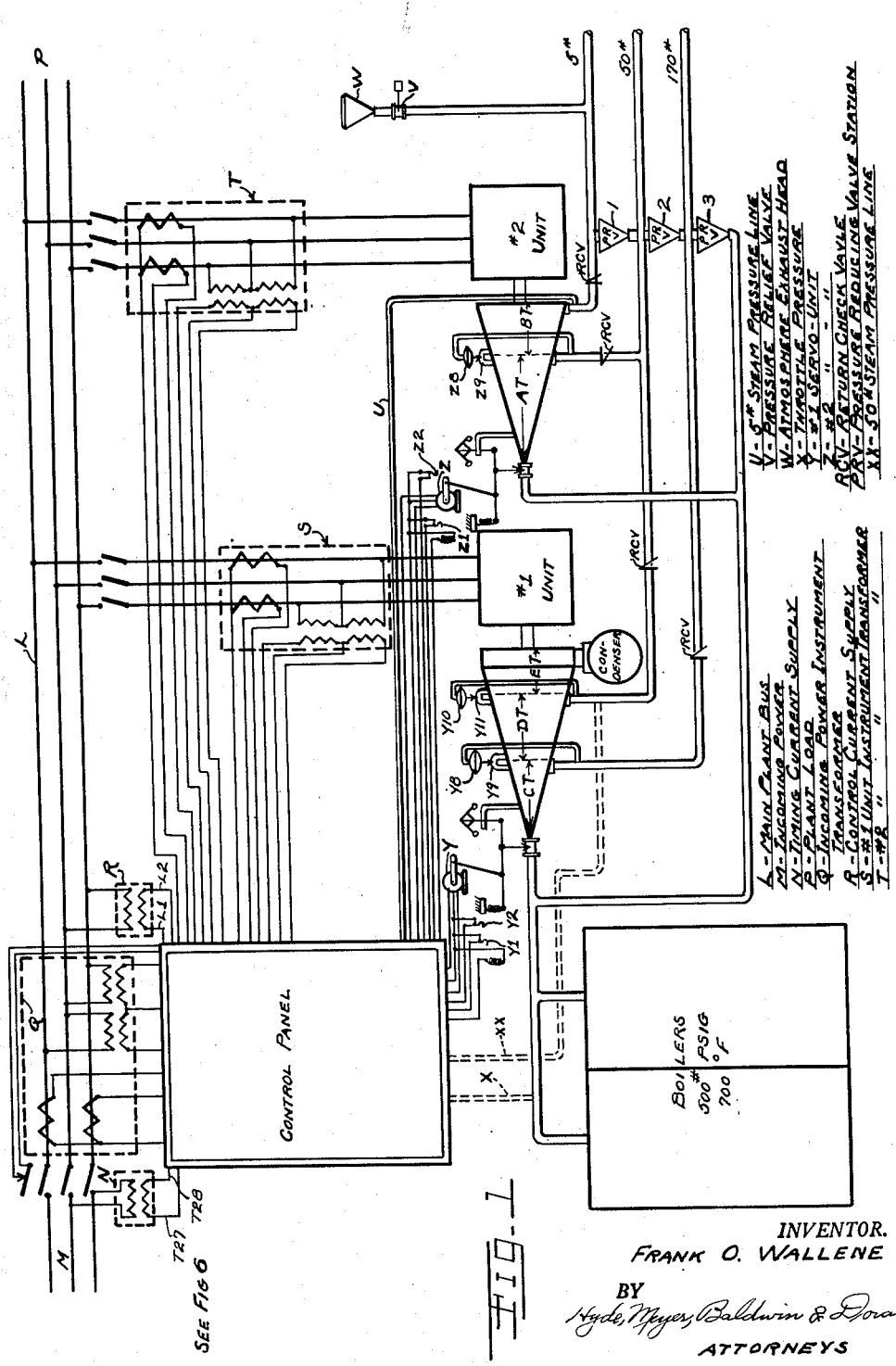
Fig. 1 is a typical power plant lay-out in which the present invention in a power control method and apparatus can be used with a resulting low over-all cost of operation.

Fig. 8 is a wiring diagram and the normal controls (responsive to the energy requirements and energy conditions of the secondary source) for the turbine units No. 1 and No. 2 in the secondary power source, as shown in Fig. 1, with controls responsive to meter C of the timing component in Fig. 6 for taking over control from said normal control when undesirable peaks occur in the flow from the primary source;

Fig. 9 is a side elevational view, partially in longitudinal section, of common parts in meters A, B and C in Fig. 6 and meters D, F and H in Fig. 8;

Fig. 10 is a view of flag 92 in Fig. 9 taken from the right thereof;

Fig. 11 is a wiring diagram of the common structure found in the electronic chassis E1 to E13 inclusive in Figs. 7 and 8 of the drawings; while Fig. 12 is a view of a portion of Fig. 8 wherein the 5# extraction pressure line U and the by-product fuel boiler pressure line X in Fig. 1 normally control the output of the turbine units No. 1 and No. 2 until positioning motor PM4 takes over control from the normal control when undesirable peaks or valleys are about to occur in the flow from the primary source. In this view for clarity, the rod corresponding to rod F5 in Fig. 8 and the limit travel switches with their cams for each positioning motor has not been shown but they exist, as shown in Fig. 8.

Before the power control method and apparatus here illustrated is specifically described, it is to be understood that the invention here involved is not limited to the structural details or arrangement of parts here shown since control method and apparatus embodying the present invention may take various forms. It also is to be understood that the phraseology or terminology herein employed is for purposes of description and not of limitation since the scope of the present invention is denoted by the appended claims.

It should be noted before reading the description that Figs. 6, 7 and 8 of the drawings are portions of the complete control. Lines L1 and L2 are common power lines. Figs. 6 and 7 are electrically connected by correspondingly numbered terminals T and by pick-up coils A1, A2 and B1 in the terminal blocks. Terminals T27 and T28 in Fig. 6 are connected to lines L1 and L2 through transformer N as shown at the upper left in Fig. 1. Figs. 6 and 8 are electrically connected by correspondingly numbered terminals T and by pick-up coils C1, C2, C3 and C4.

*General discussion of economic factors and discussion of the operation of this invention*

My invention relates to method and apparatus for automatically controlling the ratio of electric power flow or use between two sources of supply that are being used to supply a common load or "electric power use-system," based on and responsive to certain "economy factors" that have an influence on the overall cost of operation. Such an arrangement of electric power supply often occurs in industrial plants where electric power and steam for process and heating is required for manufacturing operations, and where a portion of its electric power requirements is purchased from a public utility herein referred to as the primary source, with the balance obtained from its own electric power generating equipment herein referred to as the secondary source of electric power. The steam for heating and process is obtained from the owner's steam generating equipment known as the secondary source. The customary method is to operate the boilers or steam generating equipment at a higher pressure level than is required for the successful operation of the process and heating equipment. Turbines or engines driving electrical generators are used as a means of reducing boiler steam pressure to the required process or heating needs' levels. In so doing a certain amount of heat units are converted to electrical energy, that in turn reduces by an equivalent amount the electrical energy required to be taken from the primary source. Since electric power produced in this manner is obtained at a very low heat rate per kwh. it becomes economically desirable that maximum electric power generation be obtained from such steam flows, as long as there is need for all such power.

Figure 2:
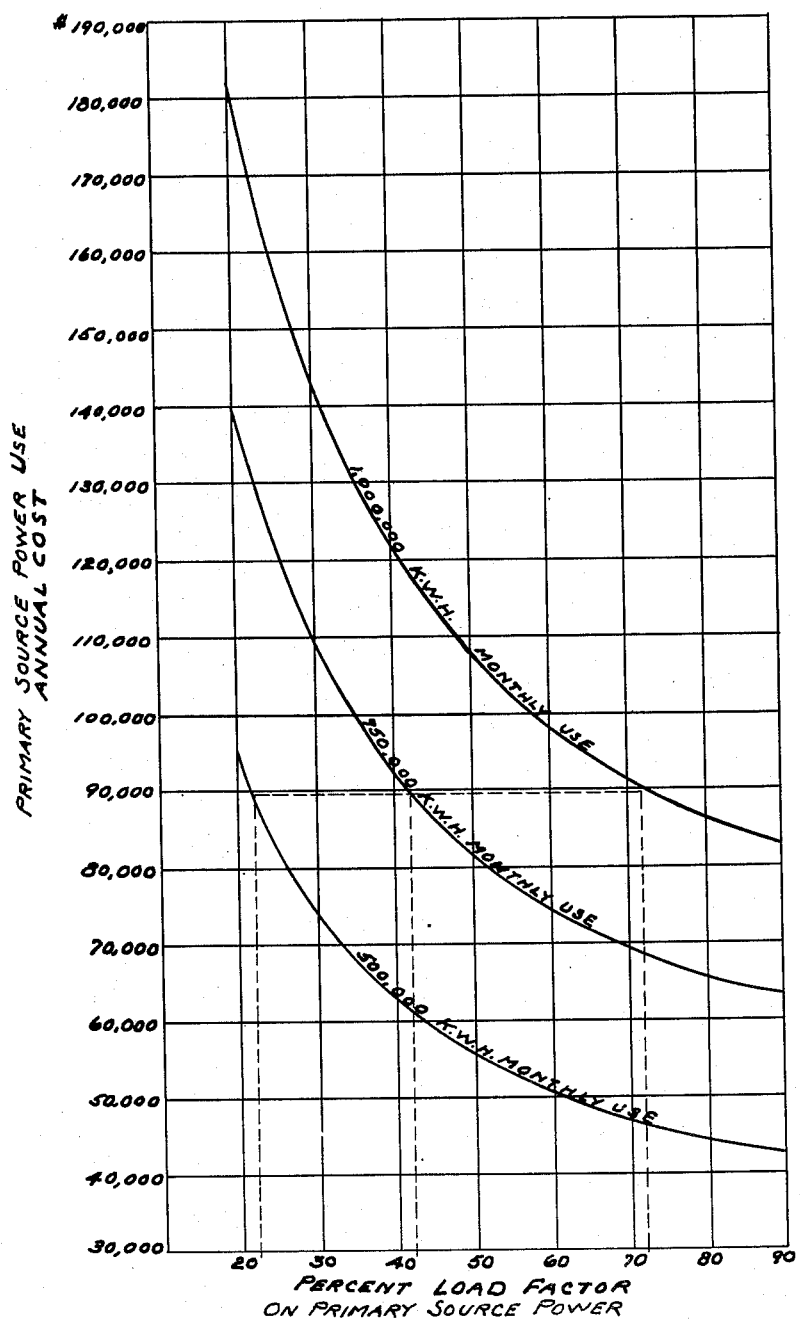
Fig. 2 is a graph of a typical public utility industrial power rate schedule indicating annual cost of three different size blocks of monthly power use and the characteristic sharp rise in cost that occurs as the load-factor recedes.

Electrical and heat energy requirements seldom if ever vary concurrently. As a result the rate of flow of power from the primary source may undergo large variations that will cause its unit cost to become unnecessarily expensive because of the so-called average kw. (kilowatt) or kva. (kilovolt-ampere) demand charge usually incorporated by public utilities in their industrial power rate schedules, unless the rate of power flow be properly controlled. Some public utilities charge on the kw. basis while others charge on the kva. basis. Fig. 2 illustrates graphically the effect on power costs due to this condition.

Fig. 2 shows the results of a typical public utility industrial power rate schedule indicating annual cost of three different size blocks of monthly power use and the characteristic sharp rise in cost that occurs as the load-factor recedes. The term "load-factor" as used in Fig. 2, is the mathematical ratio of the total kwh. used in a given billing period to the product of the maximum average kw. or kva. demand recorded for that period, as used by the utility for billing purposes, and of the total hours in the billing period. It should be emphasized that these are average kw. or kva. demands usually timed over a 15, 30 or 60 minute time period duration (the demand billing period) as distinguished from momentary or swing peak kw. or kva. demands. Note in Fig. 2 that by improving load-factor from 22% to 72%, the annual cost of 500,000 kwh. use per month is reduced from $90,000 to $47,000. Again by increasing the load-factor from 22% to 43%, 50% more kwh. may be used per month for the same annual cost, and if the load-factor is increased to 72% double the monthly use may be had without increase in cost.

In my U. S. Patent No. 1,822,071, issued September 8, 1931, and entitled "Power Control System," the secondary source power output was automatically controlled so as to first provide the amount of low pressure steam required for process and heating needs, with a second response that would raise or lower the secondary source supply if the primary source draft exceeded a predetermined maximum kw. flow or approached a condition where return power to primary source was about to take place. In that case the control was responsive to momentary or swing peak kw. demands but not to the average kw. or kva. demand over the public utility demand load billing period.

The present invention has for its object to provide method and apparatus for automatically controlling the secondary source of power output but on the basis of an average kw. or kva. demand load over the demand billing period in keeping with the same demand billing period used by public utilities for calculating demand service charges for primary source power, and on the basis of certain other features as will appear hereinafter.

Hereinafter in the description in this specification only watt (w.), kilowatt (kw.) and kilowatt hour (kwh.) terms and limits will be mentioned but it should be clearly understood that volt-ampere (va.), kilovolt-ampere (kva.), and kilovolt-ampere hour (kvah.) respectively could be used instead since some public utilities charge on a kw. and kwh. basis while others charge on a kva. or kvah. basis. Of course, such a change in electrical measurement requires that volt-ampere instead of watt type meters be used in the control where necessary.

The economic gain from using the average kw. load over the demand billing period instead of momentary or swing peak demand as a control factor for the secondary source is readily apparent as shown in co-related Figs. 3, 4 and 5. Note that three fifteen-minute intervals are shown, and it being assumed that in this case the public utility maximum demand billing period is based on fifteen-minute intervals. The same reasoning would apply to any other time interval with the control being built to respond to the same time as recorded by the utility for demand billing purposes.

Fig. 3 shows the manufacturing plant or "electric power use-system" electrical load that must be met by the primary or secondary source supplies or a combination of both.

Fig. 4 shows secondary source "by-product power" and also "excess power" generation (shaded areas) required to control peak power demands on primary source. The term "by-product power" is not correct in a literal sense, but is here used to denote that electric power capacity in kwh. available from by-product fuel or waste heat resulting from the cast-off of manufacturing operations, and/or from process and heating steam flow obtained by using the turbine or engines as a means of reducing boiler pressure to the lower levels required for such steam needs. The heat units thus converted to electric power amount to approximately 4000 B. t. u per kwh. in a typical unit. Such a low heat rate per kwh. makes it economically desirable to make full use of this particular feature of operation as long as electric power needs are equivalent to or in excess thereof.

Fig. 5 shows the resultant purchased power or primary source power flow to meet load or "electric power use-system" requirements in combination with that obtained from the secondary source when automatically controlled by means of this invention.

For the purpose of illustration, in Fig. 5, 40 kilowatt has been chosen as the given or predetermined average kw. demand limitation permissible for a full fifteen-minute interval, while 70 kw. and 0 kw. were selected as the respective maximum and minimum permissive momentary or swing kw. draft. The 70 kw. value may be the peak capacity of the supply line from the primary source. Referring now to the first fifteen-minute time interval it will be noted that the load during the first minute was approximately 80 kilowatts whereas the available "by-product power" was only 30 kw. Therefore, during that period it was necessary to actually generate at a rate of 40 kilowatt instead of 30 in Fig. 4 or 10 kilowatt of "excess power" (shaded area) in order to prevent the peak on the primary source from exceeding the 40 kilowatt chosen maximum level. The same holds true during the second minute.

During the third minute the plant load in Fig. 3 has increased somewhat and the "by-product power" capacity in Fig. 2 has started increasing. Thus it will be noticed that resultant load in Fig. 5 on the primary source is remaining constant but the "excess power" generation is tapering off in Fig. 4. Available by-product power continues to rise through the fourth minute and by the ninth minute it is in excess of the total plant load at which time the control would taper off the amount of electric power generated by the secondary source so as not to cause a return flow of power to the primary source. At that time it may be necessary that the conventional pressure reducing valves admit some live steam from the boilers directly to the process or heating lines to make up any deficit. It will be noted that from the fourth minute to the eleventh minute inclusive, the demand on the primary source has been far below the permissible demand level of 40 kilowatts that was chosen. The open areas between the 40 kilowatt line and that showing the rate of power use from the primary source are hereinafter referred to as "earned areas" or blocks of power not purchased from the primary source which makes it permissible to exceed the 40 kilowatt level from the twelfth minute on including the fifteenth without exceeding the 40 kw. average for the full time of the fifteen-minute demand billing period interval. Not until the "earned areas" have been balanced out by those above the line, does generation of "excess power" take place except that it will be noted during the fourteenth and fifteenth minute "excess power" was generated to prevent the momentary or swing peak kw. demands on the primary source from exceeding the 70 kilowatt level which was selected as being the maximum load to be imposed on the primary source power line.

The limitation on maximum electric power flow from the primary source which was originally 40 kw. was increased during the first fifteen-minute period by an amount equal to the "earned area" which is the amount that the primary source use drops below the 40 kw. line in Fig. 5. The limitation on maximum flow from the primary source now follows the dotted line until it reaches the 70 kw. level having thus formed triangle "I" and represents the first increment of "earned area" or block of power that may be used in excess of the 40 kw. rate during subsequent loadings within the fifteen-minute time interval without exceeding the 40 kw. average demand load for the full fifteen-minute demand billing period interval. From minute 7 to minute 9 inclusive a further incremental recording of "earned areas" is made and is shown as area components "J" and "K."

At the beginning of the second fifteen-minute interval generation of "excess power" in Fig. 4 took place in order to bring the demand down to the 40 kilowatt level on the primary source. This it was able to do at the end of the third minute interval by generating an excess amount during the second and third minute to offset the excess demand that had been established in the first minute. During the fourth up to and including the seventh minute the demand on the primary source was maintained at the 40 kilowatt level by generation of "excess power" above that of the so-called "by-product power" level in Fig. 4. After the seventh minute the increase in the "by-product power," caused considerable drop in the power taken from the primary source. During the twelfth minute "by-product power" supply dropped rapidly causing an increase in the power taken from the primary source. There was no "excess power" generated during the balance of this fifteen-minute interval since the "earned areas" under the 40 kw. line in Fig. 5 during low-use from minute eight to minute eleven inclusive over-balanced the area above the 40 kilowatt line that took place during minutes 13, 14 and 15 as high-use.

During the third fifteen-minute interval a small amount of "excess power" was generated during minutes one and two so as to maintain the level on the primary source at the 40 kilowatt point. Again the "by-product power" began increasing during the third minute causing a period of low-use or a reduction of use from the primary source up to and including much of the eight minutes. At that time the "by-product power" supply steadied down to a 30 kilowatt level. An increase in power flow from the primary source took place but in no event calling for "excess power" generation since the "earned areas" from minute three to minute eight inclusive were sufficient to overbalance the areas above the 40 kilowatt line in Fig. 5.

Thus it will be seen that full advantage is taken of all "by-product power" when available as shown in Fig. 4, and also advantage is taken of the "earned areas" below the 40 kilowatt average demand load line over the fifteen-minute demand billing period in Fig. 5 by permitting a subsequent rise in rate of use of primary power in excess of the 40 kw. limitation to take place when the "by-product power" diminishes and yet not allowing the average for the full time interval to exceed the predetermined average 40 kwh. permissible demand load level over the fifteen-minute demand billing period. Thus we have provided a condition that makes possible a higher load factor on the primary source than is otherwise attainable, even though momentary swing peak kw. demand automatic control as provided for in my U. S. Patent 1,822,071 is already being used.

To accomplish this, the control must automatically respond to certain "economy factors" referred to in the opening paragraph, viz:

*Economy factor No. 1.*—Rate of power use from the primary source must be held below a chosen or selected predetermined average kw. demand limit, over substantially the same timing interval as used by the public utility's meter for demand billing purposes.

*Economy factor No. 2.*—Power obtained from the secondary source must be used to augment the primary source supply, within limits, by normally and automatically controlling its rate of electric power output so as to make full use of "by-product power" when and as available, if the load is equal to or in excess thereof.

*Economy factor No. 3.*—Secondary source must automatically increase its output of electrical power up to the limit of its capacity regardless of available "by-product power" in the event that the average kw. demand load limit for the demand billing period (as distinguished from momentary or swing peak kw. demands) on the primary source exceeds the predetermined permissible level.

*Economy factor No. 4.*—Secondary source must reduce its rate of generation irrespective of available "by-product power" in the event that flow of power from the primary source recedes below a predetermined chosen minimum. The predetermined chosen minimum is sometimes influenced by the contract provisions with the public utility and may be a positive value, zero or a negative value. When the contract prescribes a minimum kw. demand and kwh. use as a base or ready-to-serve charge for each billing period, then the aforesaid minimum would be at a positive value so as to assure full use of that block of power that must be paid for whether used or not used. If the contract does not prescribe a minimum demand and energy use, and if the public utility will not credit the user for power flowing back into the transmission lines of the primary source, the aforementioned minimum would be zero. If the contract gives credit for power flowing back into the primary source, it may be economically advisable to have a negative value of the aforementioned minimum indicating reverse flow.

*Economy factor No. 5.*—During a given time interval, when kw. maximum demand is being measured there could be moments or periods when there is an abnormal supply of "by-product power" and at the same time a subnormal demand for electric power, a combination of which would result in a subnormal rate of use of power from the primary source. Since billing kw. demand is determined from the average kw. rate of use for the given demand billing time interval, the control takes advantage of these low-use periods to permit an excess demand without penalty during subsequent moments in the interval when there may be a high-use period with a reversal of the conditions, provided, however, that the average kw. demand from the start of the demand billing period must not exceed the predetermined permissible average for the complete demand billing period interval. Such excess peaks are again limited by the control on a momentary or swing peak basis so as not to impose loads on primary source beyond the capacity of its substation or its supply line or a limit arrived at by contractual agreement with the public utility primary source.

*Economy factor No. 6.*—Where there are two or more generating units in the system comprising the secondary source, means are provided so that either concurrent and/or sequential loading of the generating units may be obtained in order to take advantage of the differences in efficiencies that may exist between the units.

*Economy factor No. 7.*—Means to be provided for adjustments that will vary the optimum levels of operation, so as to take advantage of the permissible change in the kw. demand billing of the primary source without penalty on Sundays, holidays or certain hours of day or seasonal changes, as may be provided in the utility rate schedule.

*Economy factor No. 8.*—Automatic power output adjustments are made in measured increments of power output of each turbine so that automatic compensation takes place for frequency variations of the primary source, steam pressure changes of the secondary source, and such other factors as would otherwise alter the turbine output.

A typical power plant layout

Solely for the purpose of illustrating the application of the invention to a particular plant and the effects produced as it responds to the "economy factors" listed, but not in any sense of limitation of its scope, a typical paper mill power plant layout is shown in Fig. 1.

It should be emphasized that as soon as the turbine units of the secondary source are connected in parallel with the primary source which is assumed to be large enough to hold constant electrical frequency, the conventional speed governor on the generating units of the secondary source ceases to function as an automatic electric load controller. The head end steam admission to each turbine is automatically regulated by this invention.

Referring to Fig. 1, M is the primary source supply line. L is the plant system switchboard bus. N is the timing current supply transformer to the timing component on the control unit. After the control unit timing component has been synchronized with the utility company's demand meter timing component, the two will continue in step with each other with each operating over the same demand billing period of 15, 30 or 60 minute duration even though the main supply switch in Fig. 1 to the primary source may be opened. P is feeder to the total manufacturing plant load or "electric power use system." Q is the instrument transformer group for the meters in the control unit that measure and record power flow from the primary source. R is the control current supply (leads marked lines L1 and L2) lines to control unit for operating the various devices contained therein. S is the instrument transformer group for the measuring instrument in the control unit that measures the output of turbine unit No. 1. Transformer T is similar to transformer S but is used with turbine unit No. 2. It will be noted in Fig. 1 that both of the turbine units are equipped with conventional extraction pressure controls as incorporated by turbine builders in their standard design. In some instances the pressure control is tied in with the front end steam admission as a means of obtaining greater accuracy of pressure control and thereby producing a stabilizing effect on the power output of the unit, particularly when not operating in parallel with a large system that is controlling frequency and therefore controlling its own speed or frequency.

After both units have started and are running in parallel with the primary power source but are developing no output of electric power, the conventional speed governors have now ceased to function as automatic load controllers since frequency is assumed to be held by the primary source. Up to this time steam supplied to the process lines is being obtained from the conventional pressure reducing valve stations shown as PRV1, PRV2, and PRV3 adjusted to a somewhat lower pressure than the pressure settings on the turbines. PRV1, PRV2 and PRV3 close when turbine supply is sufficient to maintain the optimum pressure levels in the extraction lines.

It should be noted that the turbine units No. 1 and No. 2 in Fig. 1 are divided into sections AT, BT, CT, DT and ET with the 5#, 50# and 170# steam extraction lines connected to the low pressure ends of sections BT, DT and CT. When pressure at the extraction end of sections CT, DT or AT respectively rise beyond the 170#, 50# or 5# optimum level, regulator Y8, Y10 or Z8 opens the valve in by-pass Y9, Y11 or Z9 admitting steam to section DT, ET or BT until the exhaust pressure of that section has risen to its optimum level.

The admission of steam to the turbine units No. 1 and No. 2 is normally controlled by pressure response or responses to the pressure or pressures in the steam flow path from the boiler to extraction steam lines. This normal control of the secondary source makes full use of "by-product power" before any other power is generated. U is the steam line from the 5# stage or exhaust pressure that connects to a pressure response element in the control unit to form a pressure response component. V is a conventional pressure relief valve to allow steam to escape to atmosphere in the event of excess pressure in that line. W is the conventional exhaust head. X is the steam pressure connection from the boiler supply pipe line to the turbines which pressure is used for load control response when by-product fuel or waste heat supply is used for generating boiler pressure steam which pressure then becomes the response factor for power output adjustment taking predominance over the stage or exhaust pressure. Pressure line X is connected to a pressure response element in the control unit to form a pressure response component. When by-product fuel is burned or waste heat is used as long as it is available, purchased fuel is not added to the boiler until the pressure drops in the steam line from the boiler as an indication of insufficient heat. Purchased fuel can be added automatically by one of the conventional fuel feeding means in response to this pressure drop. Y is the servomotor controlling head end steam admission to turbine unit No. 1. Servomotor Z is similar to servomotor Y but is connected to turbine unit No. 2. RCV items are return flow check valves of the usual conventional type. PRV items are conventional pressure reducing valve stations arranged to open only when steam supply from turbines fail to meet the demand for steam in the process and heating lines as evidenced by drop in optimum pressure levels. XX is a steam pressure connection from the 50# extraction stage pressure or process steam line that connects to a pressure response element in the control unit to form a pressure response component. Each pressure line U, X, or XX with its pressure response element in the control unit is not necessarily used simultaneously in the same power plant installation. The pressure response components can be used singularly or in various combinations, such as, the component with pressure line U; the components with pressure lines U and X; the components with pressure lines U and XX; etc. Also, more or fewer pressure components may be used when there is respectively more or fewer generating units than the two units No. 1 and No. 2 in Fig. 1. The number of components is determined by the operating characteristics and factors of the particular power plant installation. The various combinations will be described in more detail in the section entitled "Normal Control of Steam Flow to Turbines."

From the foregoing description it should be readily apparent and understood that this invention presents a wide range of versatility that may be arranged to meet almost any plant condition that is within the scope of ratio of power use between two sources of power that has an influence on overall costs of supplying electric power to the manufacturing operations.

*Timing component*

The principal function of the timing component is to limit the electrical draft on the primary source to a predetermined average kw. demand during the public utility demand load billing period by causing the secondary source to supply power to the load when necessary. The timing component is synchronized with the public utility demand billing meter to operate over the same 15, 30 or 60 minute demand billing period, whichever period is used by the public utility. When the draft on the primary source is about to exceed this predetermined average amount during the demand billing period, the timing component through meter C in Fig. 6 takes over control from the normal turbine controls causing servomotors Y and Z in Fig. 8 to increase the steam flow to the turbines and therefore increase the electrical output of the secondary source so that the draft on the primary source is kept below the predetermined permissible average amount. Although this is a description of only the broad aspects of the timing component, other aspects will become more apparent in the following description.

The timing component consists essentially of two similar kilowatt demand meters (A and B in Fig. 6) of the type used by public utilities for billing purposes, one of which (meter A in Fig. 6) registers electric power flow to a calibrated constant phantom load that gives its readings the status of a yardstick, while the other (meter B in Fig. 6) registers the variable power flow from the primary source. The yardstick phantom load reflects a measure of the permissible uniform rate of power use from the primary source for each time interval. Each is provided with a mechanism so interconnected to one another that an algebraic indication is obtained of the two registrations. This algebraic indication, which is a measure of the unbalance between meters A and B, is in turn mechanically communicated to a third instrument (meter C in Fig. 6). Meter C, whose normal function is to indicate the kw. flow from the primary source, causes servomotors Y and Z (Fig. 8) to correspondingly change the electrical power output of the secondary source units No. 1 and No. 2 by taking over their control from the normal turbine controls.

Referring to Fig. 6, meter A is a single phase kw. demand meter that is connected to a phantom load of substantially constant value so that its pointer moves at a uniform rate in the clockwise direction over the demand billing period. A synchronous motor clock driven by the frequency of the primary source could be used for driving the pointer but is not as readily usable because its range of deflection is not readily adjustable. The importance of the adjustability feature will be brought out in the description hereinafter. It will also be apparent that other means moving at a constant rate and not driven by the primary source might be used but not as advantageously. The total arcuate pointer movement of meter A during each demand time interval is substantially the same. Its timing motor (found on the conventional demand meter) is arranged to return the pointer counterclockwise to zero at the same moment that the utility company's meter returns to zero. The current supply for the timing motor is obtained from terminals T8 and T9 connected to timing switch TS and thence to terminals T27 and T28 to transformer N in Fig. 1 and thus to the same source of current supply as used by the public utility for their demand meter used for billing purposes. In the public utility's meter, the pointer is left at the maximum position until finally turned back by their meter reader and only the dog that raised it to that position is returned. In this case the pointer is tied to the dog in meter A and therefore returned to zero at the end of each time interval. Rheostats A11 and A12 are means for adjustment to provide the required arcuate length of pointer movement for each demand billing time interval corresponding to said predetermined average kw. uniformly used over said interval.

WM is properly calibrated indicating watt meter serving as an indicator of the prevailing calibration setting on meter A.

A13 is a variable current supply transformer which, together with the potential connection to meter A and wattmeter WM, constitutes the phantom load supply. Its current supply is obtained from primary source lines L1 and L2 through terminals T10 and T11 connected to timing switch TS.

Meter B is a polyphase kw. demand meter without timing motor (the timing motor in meter A serves for both meters A and B), but otherwise similar to meter A. It is calibrated to obtain the same arcuate length clockwise movement of its pointer as meter A when registering the optimum rate of power flow (the predetermined average kw. demand load over the demand billing period) from the primary source. Hence, the yardstick phantom load causes an arcuate movement on meter A equivalent to the arcuate movement on meter B when power is being used from the primary source at a uniform rate during the public utility demand billing period at said predetermined average kw. rate. This calibration is accomplished by varying the current flow by means of step switches B13 and B14 on step up current transformer B8 for coarse adjustment and potential rheostats B11 and B12 for the finer adjustment. Meter B actually does not measure kw. nor does it necessarily measure the exact kwh. but continually measures an amount proportional to (a constant proportionality factor continuously exists for any given setting of switches B13, B14 and of transformer B8) the kwh. flow from the primary source from the beginning of the demand billing period. Hence, meter B in the timing component is sensitive or responsive to the power draft on the primary source. The timing motor of meter A also returns the pointer of meter B counterclockwise to zero synchronously with the return of the pointer of meter A.

Thus we have meter A as a rotating standard, and meter B as a measure of primary source power having a variable flow that is to be controlled, and therefore meters A and B constitute means for comparing two power measurements.

An alternate construction can be used, if desired, with meter A having a constant phantom load (having no adjustment) under all conditions with an approximately constant arcuate length pointer movement and with meter B having an adjustable length arcuate pointer movement as before while having wattmeter WM in its circuit. However, this construction with meter A fixed and meter B adjustable is not as desirable as that in which both meters A and B are adjustable since the selection of the most desirable and longest possible arcuate length determines to a great degree the sensitivity of the timing component.

Meters A, B, C, D, F and H in Figs. 6 and 8 are all somewhat similar in construction and the movement of each controls one or more of the electronic chassis E1 to E13 inclusive in Figs. 7 and 8. Rather than to describe each meter individually, Figs. 9 and 10 disclose a meter having many of the common parts in the aforesaid meters working on the same principles. Fig. 11 discloses the electronic structure found in each electronic chassis E1 and E13.

Referring to Fig. 9, the conventional kw. demand or other type conventional electric, pressure, etc. meter is shown as 903 in Fig. 9 with a contact carrying structure mounted in front. Meter shaft 904 carries the pointer and is extended through the cover on which shaft is mounted arm 91. Arm 91 extends through a radial slot 93 in flag 92 shown in Fig. 9 and Fig. 10. The two pancake type electronic pick-up coils 905 in Fig. 9 and Fig. 11 are carried by arm 97 in a straddling position of flag 92. The metal flag 92 is mounted on shaft 98 supported by bearings 99, and is rotated independent of shaft 95 supporting arm 97. Shaft 95, telescopically receiving shaft 98, is supported by bearing pedestal 94. 901 is the crank pin on meters D, H or F for reach rods G1, G2 or F5 in Fig. 8. In meters A, B and C in Fig. 6, gears A7, B7 and C21 respectively take the place of crank pin 901 on shaft 95. 902 is a flexible shielded two wire cable connecting electronic pick-up coils 905 to their respective electronic chassis terminals 911 and 912.

The electronic chassis circuit shown in Fig. 11 is one of several that may be used. It uses the oscillator flag principle. As little as .004 inch flag movement will open and close the direct current relay 906 which is mounted on and made a part of the electronic chassis component. The oscillator coils herein referred to as pick-up coils are two pancake type coaxially placed series aiding coils 905, spaced 1/8 inch apart and rigidly mounted on arm 97 in Fig. 9. They are connected by shielded, two conductor flexible cable 902 to terminal 911 and 912 in Fig. 11 on the tuned grid circuit that is resonated by its distributed capacitance. The tuned plate circuit consists in part of inductance coil L3 and variable condenser LC3 with the latter being made variable for alignment purposes. The electronic circuit receives its power from a suitable transformer 913 connected to power lines L1 and L2 and this circuit includes a tube 914 known among those skilled in the art as tube No. 53. The oscillator is resonated with flag 92 in Fig. 9 completely out of the field of the coils 905 by adjusting variable condenser LC3. Under this condition maximum negative bias is developed on the oscillator grids resulting in minimum flow of direct current through the coil of relay 906. With flag 92 covering half the area of the pick-up coils 905, 905, the frequency of operation rises to the balance frequency, decreasing the strength of oscillations with resulting rise in direct current flow to the coil of relay 906. The minimum flow in the coil of relay 906 with flag 92 out of coils 905 is approximately 3 milliamperes and when flag 92 is covering half of the coil areas it is approximately 14 milliamperes. Relay 906 is adjusted for 11 milliamperes pull-in on current rise and 9 milliamperes let-go on decrease current which gives satisfactory performance. It will be noted that there is no mechanical interference between pick-up coils and the flag, and therefore the flag may pass on through without affecting meter indication accuracy. Tests made with commercial testing equipment and actual control performance have failed to give evidence of any inductive magnetic drag on the flag by pick-up coils 905.

In the case of meters A and B of Fig. 6, arm 96 in Fig. 9 takes the form of gears A7 and B7 shown in Fig. 6. Flag 92 in Fig. 9 takes the form of flags AX and BX in Fig. 6. Thus the meter shaft of meter A, corresponding to shaft 904, rotates flag AX while the shaft of meter B rotates flag BX. Contact arms A3, A8 and B3 are shown as 97 in Fig. 9. As flags AX and BX intercept pick-up coils A1 or A2 and B1, they upset resonance in the electronic circuit of the electronic chassis E2 or E1 and B1 respectively that in turn causes relay coil 906 in the chassis in Fig. 11 to close the contacts connecting terminals 909 and 910 in the respective electronic chassis E2 or E1 and B1.

Pin B2 on arm B3 of meter B in Fig. 6 limits the advancing clockwise movement of flag BX and it is also used as a device to return flag BX to zero at the end of the time interval, making it unnecessary to provide meter B with a timing motor. This it can do without damage since both flags AX and BX are on meter pointer shafts 904 in Fig. 9 that are friction driven.

In order to gain a clearer understanding of the forthcoming explanatory details of operation, it should be pointed out that the intercepting action of pick-up coils A1 by flag AX advancing in the clockwise direction causes positioning motor PM1 to rotate clockwise which immediately advances in the clockwise direction pick-up coils A1 causing them to move beyond the influence of flag AX thereby providing a compensating action or restoring action. The same holds true with pick-up coils B1 and flag BX which cause positioning motor PM2 to rotate clockwise. However, for practical reasons that will be apparent later on, pick-up coils A1 cannot start positioning motor PM1 until pick-up coils B1 are intercepted by flag BX for starting positioning motor PM2 or vice versa. Both positioning motors must start at the same time. On the other hand, there are two important different manners of stopping the positioning motors. First, they can each stop independently. Second, the stopping of positioning motor PM2 will also stop positioning motor PM1 but the stopping of positioning motor PM1 will not stop positioning motor PM2. The function of the interlocking relays R10 and R12 (Fig. 7) in this part of the circuit will now be more apparent.

Having now established the means shown in Fig. 11 whereby the electronic pick-up coils on the contact arms perform their function, we are in position to better follow the response functions. Referring to kw. demand meter A in Fig. 6 whose flag AX is traveling clockwise at substantially constant speed, when flag AX intercepts pick-up coils A1, electronic chassis E2 energizes relay R2 by forming an electrical circuit from line L2 to normally closed contact 7 to 8 of relay R1 to the closed contact of electronic chassis E2 to relay R2 coil to terminal T26 (Fig. 7) to poles S15 and S14 (synchronizing switch TS normally to the right) to terminal T25 to relay R4 normally closed contact 4 to 5 to line L1. Relay R2 contact 5 from line L1 to contact 6 closes relay R12 coil to line L2 and also closes relay R9 coil through terminal T4 of Fig. 6 to limit switch A10 for preventing over travel to terminal T1 of Fig. 7 to previously closed relay R2 contact 9 to contact 8 to line L2. Positioning motor PM1 has not as yet started and cannot do so until flag BX on meter B has intercepted pick-up coils B1. When it does, electronic chassis E3 of Fig. 7 closes relay R3 by forming an electrical circuit from line L2 to normally closed contact 7 to 8 of relay R1 to the closed contact of electronic chassis E2 to relay R3 coil to terminal T26 (Fig. 7) to poles S15 and S14 (synchronizing switch TS normally to the right) to terminal T25 to relay R4 normally closed contact 4 to 5 to line L1. Line L1 is then connected by closed contacts 5 to 6 of relay R3 for energizing relay R10 coil to line L2 and also for energizing relay R11 coil through terminal T21 of Fig. 6 to limit switch B10 for preventing overtravel to terminal T24 of Fig. 7 to relay R3 closed contact 9 to 8 to line L2. It would be well to point out at this time that relay R12 acts as an anticipation relay that meter B will soon be calling for movement but positioning motor PM1 must not start until meter B calls for positioning motor PM2 to start. The same reasoning applies to relay R10 in that relay R10 acts as an anticipation relay that meter A will soon be calling for movement but positioning motor PM2 must not start until meter A calls for positioning motor PM1 to start. At this point it will be observed that relays R9, R10, R11 and R12 are in closed position as a result of the closing of relays R2 and R3, and now relay R13 is closed by flow from line L1 to relay R3 closed contact 5 to 6 through relay R10 contact 5 to 6 through relay R9 contact 6 to 5 to relay R13 coil to line L2. Relay R14 likewise is closed but by relay R12 closed contact 5 to 6 from line L1 (through relay R2 contact 5 to 6) through relay R11 contact 6 to 5 to relay R14 coil to line L2.

Current supply to positioning motor PM1 is obtained from line L1 through closed contact 5 to 6 of relay R3 through closed contact 2 to 3 of relay R10 to relay R9 closed contact 3 to 2 to relay R13 closed contact 6 to 5 to terminal T7 of Fig. 6 to positioning motor PM1 (for clockwise rotation) to terminal T5 connected to line L2.

A20 and B20 are electrostatic starting condensers used with this type of positioning motor.

Positioning motor PM2 obtains its current from line L1 through relay R2 contact 5 to 6 through relay R12 closed contact 2 to 3 to relay R11 closed contact 3 to 2 to relay R14 closed contact 6 to 5 to terminal T20 on Fig. 6 to positioning motor PM2 to terminal T19 connected to line L2.

Both positioning motors PM1 and PM2 are now rotating clockwise and will obviously stop as soon as arms A3 and B3 have advanced beyond the influence of flags AX and BX. These motors are geared down so that output shaft speed is at a very low speed, less than 1 R. P. M.

Relays R13 and R14 function as dynamic braking relays for positioning motor PM1 and PM2 when said relays are opened. Then, they apply D. C. current from plate rectifiers REC1 and REC2 to the respective positioning motors which are quarter phase induction type squirrel cage motors. The D. C. current acts on the rotors in the same manner as the permanent magnets act on a watt hour meter disc to prevent overrun due to inertia of the motor rotors when the motors are deenergized.

Referring now to meter A in Fig. 6, clockwise rotation of motor pinion A4 causes rack A5 to move downwards in rack supporting bearing blocks A6. Gear A7 is moved clockwise, and since contact arms A3 and A8 are fastened thereto, a jog or step clockwise motion is obtained to advance arm A3 clockwise ahead of flag AX. The same arrangement and movement holds true with meter B, positioning motor PM2, motor pinion B4, rack B5, rack supporting bearing blocks B6, gear B7, arm B3 and flag BX.

Rack A5 has mounted on it a pin A15 carrying a roller A14 and rack B5 has mounted on it a pin B14 carrying a roller B13. Rod A16 is a three arm forked arrangement with one arm straddling roller A14, the opposite arm straddling the corresponding roller B13 on rack B5 while the third arm forms a fork straddling square nut C16 on shaft C15 of meter C.

If both flags AX and BX are traveling at the same rate of speed, arm A16 will be moved downwardly in a maintained horizontal plane and no change will be made in electrical output of the secondary source since the power from the primary source, measured by meter B, is in harmony with the ideal phantom load on yardstick meter A. Should flag BX rotate at a slower speed than flag AX, indicating an unbalanced condition between meters A and B, then rod A16 will approach a position as shown in dot-dash lines. Had it continued in the horizontal plane there would have been no movement of square block C16 rotatably supported on pin C15. It is evident then that unequal movements will cause a repositioning of the contact arm assembly carrying contact arms C7 and C8 corresponding to arm 97 in Fig. 9 and being rotated by square block C16 through gears C13 and C21. It will be found later in the specification that this unbalance will change under certain conditions the secondary source output by changing the steam flow rate to the turbines.

Although positioning motors PM1 and PM2 must always start simultaneously, due to change in condition the stopping action is independent in one case and interdependent in another. First, when switch C14 on meter C is closed, positioning motors PM1 and PM2 can stop independently. Second, when switch C14 is open, the stopping of positioning motor PM2 will also stop positioning motor PM1 but the stopping of positioning motor PM1 will not stop positioning motor PM2. At this point it may be well to review the energizing circuit for positioning motors PM1 and PM2 previously described in this timing component section.

In the first stopping manner where both position motors PM1 and PM2 can stop independently of each other, stopping positioning motor PM1 does not stop positioning motor PM2. As pick-up coils A1 advance beyond the influence of flag AX while pick-up coils B1 are still intercepted by flag BX, positioning motor PM1 is stopped by the opening of relay R2. Opening relay R2, de-energizes relay R9 coil by opening relay R2 contact 5 to 6 in its energizing circuits. De-energizing relay R9 opens R9 contact 5 to 6 which de-energize relay R13 coil to open relay R13 contact 6 to 5 for stopping positioning motor PM1. However, since relay R3 is still energized (pick-up coils B1 are still intercepted by flag BX), relay R11 coil is kept energized by its original energizing circuit from line L1 to relay R3 contact 5 to 6 to relay R11 coil to terminal T21 (Fig. 6) to limit switch B10 to terminal T24 (Fig. 7) to relay R3 contact 9 to 8 to relay R1 contact 8 to 7 to line L2. Relay R12 and R14 coils are kept energized by circuit from line L1 to relay R3 contact 5 to 6 to relay R11 contact 9 to 8 to terminal T16 (Fig. 6) to terminal T17 (Fig. 7) to relay R12 contact 8 to 9 through three parallel routes to line L2 with one route through relay R12 coil and with another route through relay R12 contact 5 to 6 to relay R11 contact 6 to 5 to relay R14 coil. The third parallel route to line L2 goes to relay R12 contact 2 to 3 to relay R11 contact 3 to 2 to relay R14 contact 6 to 5 to terminal T20 (Fig. 6) to positioning motor PM2 to terminal T19 to line L2. Hence, positioning motor PM2 continues to rotate clockwise (even though positioning motor PM1 has stopped) until pick-up coils B1 advance clockwise ahead of flag BX to de-energize relay R3 coil which action opens relays R11, R12 and R14 to stop positioning motor PM2.

In the first stopping manner where both positioning motors PM1 and PM2 can stop independently of each other, stopping positioning motor PM2 does not stop positioning motor PM1. As pick-up coils B1 advance beyond flag BX while pick-up coils A1 are still intercepted by flag AX, positioning motor PM2 is stopped by the opening of relay R3. Opening relay R3, de-energizes relay R11 coil by opening relay R3 contact 5 to 6 in its energizing circuit. De-energizing relay R11 coil opens relay R11 contact 6 to 5 which in turn de-energizes relay R14 coil to open relay R14 coil contact 6 to 5 for stopping positioning motor PM2. However, since relay R2 is still energized (pick-up coils A1 are still intercepted by flag AX), relay R9 coil is kept energized by its original energizing circuit from line L1 to relay R2 contact 5 to 6 to relay R9 coil to terminal T4 (Fig. 6) to limit switch A10 to terminal T1 (Fig. 7) to relay R2 contact 9 to 8 to relay R1 contact 8 to 7 to line L2. Relay R10 and R13 coils are kept energized by a circuit from line L1 to relay R2 contact 5 to 6 to relay R9 contact 9 to 8 to terminal T14 (Fig. 6) to closed switch C14 to terminal T15 (Fig. 7) to relay R10 contact 8 to 9 through three parallel routes to line L2 with one route through relay R10 coil and with another route through relay R10 contact 5 to 6 to relay R9 contact 6 to 5 to relay R13 coil to line L2. The third parallel route to line L2 goes to relay R10 contact 2 to 3 to relay R9 contact 3 to 2 to relay R13 contact 6 to 5 to terminal T7 (Fig. 6) to positioning motor PM1 to terminal T5 to line L2. Hence, positioning motor PM1 continues to rotate clockwise (even though positioning motor PM2 has stopped) until pick-up coils A1 advance clockwise ahead of flag AX to de-energize relay R2 coil which action opens relays R9, R10 and R13 to stop position motor PM2.

In the second stopping manner wherein switch C14 is open, it should be clear that the stopping of positioning motor PM2 will also stop positioning motor PM1 since the open switch C14 prevents the continued energization of relay R10 and R13 coils in the circuit mentioned in the preceding paragraph. However, the stopping of positioning motor PM1 will not stop positioning motor PM2 since the circuit through terminals T16 and T17 energize relay R12 and R14 coils, as mentioned in the first paragraph describing in detail the first stopping manner.

Meter C is an indicating wattmeter that indicates the KW flow from the primary source. The contact arm assembly of meter C varies somewhat from that shown in Fig. 9, in that a second bearing pedestal, like pedestal 94 but shorter in height, is placed in front of pedestal 94 and carries pin C15, square block C16, friction plate C17, gear C18, coil C19, and mechanical lock C20. Square block C16, friction plate C17 and gear C18 are rotatably mounted in driving engagement on pin C15. Also there are two flags CX and CY both mounted on shaft 98 (Fig. 9) supported by bearings 99, but each flag rotates in a different plane so that movable contact arms C7 and C8 are not interfered with in their required range of travel by stationary contacts C5 and C6. Contacts C5 and C6 are mounted relatively stationary on meter C and have pick-up coils C1 and C2 respectively for interception by flag CX. Contact arms C7 and C8 carry pick-up coils C3 and C4 respectively for interception by flag CY. Contact arms C7 and C8 are mounted on gear C21 and therefore move with said gear as a unit. These contact arms C7 and C8, carrying stop shoes C11 and C9 respectively, are movable between mechanical stops C12 and C10 engageable with said stop shoes. Stop C12 and contact switch C13 are mounted on a common arm extending outwardly from the axis of rotation of gear C21 while stop C10 and contact switch C14 are mounted on another similarly extending separate arm.

It should be noted at this point that flags CX and CY are each shown in Fig. 6 between their respective pick-up coils for clarity. However, they actually have a larger angular spread between them than that shown in Fig. 6.

The stops C10 and C12 and the contacts C5 and C6 are stationary with respect to meter C while the control is in operation. The position of stop C12 is determined by the predetermined average KW demand over the demand billing period (40 kw. in Fig. 5) on the primary source, while the position of stop C10 is determined by the maximum permissible swing peak kw. draft (70 kw. in Fig. 5) on the primary source of power which either may be an agreed upon amount or may be regarded as the maximum kw. capacity of the primary source. The setting of contact C5 corresponds to the predetermined chosen minimum flow from the primary source ("0" kw. in Fig. 5), as mentioned in economy factor No. 4. Since the kw. values for stops C10 and C12 and the contacts C5 and C6 may vary between power plant installations and even from time to time within the same installation, the steps and contacts can be made adjustable with respect to meter C and with respect to each other. However, contact switches C13 and C14 move respectively with stops C12 and C10 since they are on common radial arms.

Assume that the position of contact C' in Fig. 6 is such that when demand meter A is reading no load or zero scale, flag CX will be intercepting pick-up coils C1 in contact C5, while 10% scale reading on wattmeter C might cause flag CX to intercept pick-up coils C2 on contact C6. Assume also that contact arms C7 and C8 are spread apart to a range where 10% scale variation in the movement of flag CY will cause one or the other of C3 or C4 pick-up coils to come under the influence of flag CY. Supposing that rod A16 has assumed a position as shown by the dot-dash lines in Fig. 6, square block C16 has been rotated on pin C15 in a counterclockwise direction. Block C16, fastened rigidly to friction plate C17 bearing against gear C18, communicates its motion to gear C18 by friction contact and then to gear C21 carrying contact arms C7 and C8. Should arms C7 and C8 be prevented from further travel by mechanical stops C12 or C10, no harm will result since further movement of block C16 is permitted by friction slip between plate C17 and gear C18. Additional functioning of these parts of the control will be apparent further on in the specification and especially in the section entitled "Earned Area Recording."

The timing component has been described with the assumption that the utility demand charge is on the basis of the average kw. over the demand billing period. If the charge is on the basis of the average kva., only a minor change in meters B and C would be necessary. Meter A would remain a single phase kw. demand meter with its timing motor; meter B would be a polyphase kva. demand meter without timing motor; while meter C would be an indicating volt-ampere meter indicating the kva. flow from the primary source. In fact, the kw. demand meter B can be easily transformed into kva. demand meters by inserting a small autotransformer into the potential leads going to the instrument that in turn alters the phase angle.

Return to zero movements of timing component

Meters A and B in Fig. 6 at the end of each demand time interval return to zero in synchronism with the same movement by the demand billing meter of the primary source.

A general idea of the return movement is given first before the more detailed explanation following this paragraph. The initial return-to-zero movement occurs when the timing motor, which is an integral part of the conventional kw. demand meter A (similar to that used by the public utility for billing purposes), returns flag AX on meter A to zero by rotating the flag counterclockwise. During this movement, flag AX intercepts pick-up coils A2 on contact arm A8 which previously had been advanced clockwise with contact arm A3 since arms A3 and A8 together with gear A7 form a rigid unit assembly with all parts moving together. When the pick-up coils A2 are intercepted by flag AX, both positioning motors PM1 and PM2 rotate counterclockwise. Since the starting relays are electrically interlocked, positioning motors PM1 and PM2 will continue their counterclockwise rotation after once started even though flag BX intercepts pick-up coils B1 or flag AX ceases to intercept pick-up coils A2 until travel limit switches A9 and B9 are both opened. When this occurs rollers B13 and A14 have been raised to the top level limit of their travel. Since both flags AX and BX are now at zero position, rod A16 will assume a horizontal position, although it may have been off-horizontal when it started the return stroke. It is evident that square block C16 would be rotated to compensate for any such change. This would cause a change in position of gear C21 carrying contact arms C7 and C8, producing a false motion that must be prevented in the transition from one time interval to the next to prevent abrupt load changes on the system. To prevent this, coil C19 of mechanical lock C20 is energized at the same time that flag AX intercepts pick-up coils A2 for swinging a pivotally mounted dog on lock C20 into locking engagement with the teeth of gear C18 for causing a holding action of gear C18 that prevents movement of gear C18 by friction plate C17. The holding effect of lock C20 on gear C18 continues until both positioning motors PM1 and PM2 have returned far enough to open their respective up travel limit switches A9 and B9 in Fig. 6. It continues engaged until the next billing demand period has started with both flag AX and arm B3 moving clockwise. The time during which gear C18 is locked is so short that a satisfactorily smooth transition from one time interval to the next is obtained to give the gradual change shown in Fig. 5 between the first and second fifteen minute periods.

The following is a detailed explanation of the impulses and responses that occur during the return-to-zero movement. Repeating again, only meter A is equipped with a timing motor, and that is an integral part of the standard conventional kw. demand meter which is similar to the meter used by the public utilities for billing purposes. The first effect that causes return-to-zero movement of meters A and B results when the timing motor in meter A returns flag AX counterclockwise to zero causing flag AX to intercept pick-up coils A2. Electronic chassis E1 in Fig. 7 then closes relay R1 coil to initiate the returning of arms A3, A8 and B3 counterclockwise to their zero position with pin B2 on arm B3 returning flag BX to zero. The timing motor of meter A can return flag BX to zero without damage since pointer shaft 904 (Fig. 9) of meter B is merely frictionally driven by the mechanism in meter 903. Electronic chassis E2 and E3 are at the same time disconnected from line L2 supply since relay R1 normally closed contact 7 to 8 has been opened, that had been the supply for electronic chassis E2 and E3 during clockwise movements. Relay R1 being closed, an electrical path is formed from line L1 through closed contact 3 to 2 of relay R1 to relay R6 coil to line L2 closing relay R6. Then, a circuit is completed between lines L1 and L2 through relay R1 closed contact 6 to 5 to relays R4 and R5 coils to terminals T2 and T23 in Fig. 6 to travel limit switches A9 and B9 to terminals T3 and T22 respectively to line L2. Relay R1 has now closed relays R4 and R5 each of which is provided with its own holding contacts 8 and 9. Thus, when relay R1 drops out when flag AX moves counterclockwise past pick-up coils A2 back toward zero, relays R4 and R5 are still held in until limit switches A9 and B9 open. Thus, relay R4 by reason of open contact between its contacts 4 and 5 prevents relays R2 and R3 from functioning until relay R4 opens as positioning motor PM1 reaches the return movement limit of travel established by limit switch A9, although relay R1 may have dropped out.

Closing relays R4 and R5 causes positioning motors PM1 and PM2 to rotate counterclockwise. When relay R4 is closed, a circuit is formed from line L1 to relay R4 closed contact 5 to 6 to relay R13 coil to line L2 closing relay R13. A circuit is formed from line L1 to relay R4 contact 2 to 3 to relay R13 contact 9 to 8 to terminal T6 (Fig. 6) to positioning motor PM1 (causing counterclockwise rotation for raising rack A3) to terminal T5 to line L2. When relay R5 is closed, a circuit is formed from line L1 to relay R3 closed contact 5 to 6 to energize relay R14 coil to line L2 closing relay R14. A circuit is formed from line L1 to relay R5 contact 2 to 3 to relay R14 contact 9 to 8 to terminal T18 (Fig. 6) to positioning motor PM2 (causing counterclockwise rotation for raising rack B5) to terminal T19 to line L2. Neither relay R4 nor relay R5 can drop out, after once being closed, by any function except the opening of travel limit switches A9 and B9 respectively.

Relay R6 when closed, energizes coil C19 of mechanical lock C20 that prevents movement of gear C18 simultaneously with the beginning of the counterclockwise return of arms A3, A8 and B3 until after the next demand billing time interval has started with both flag AX and arm B3 moving clockwise. Hence, the mechanical lock C20 maintains a smooth power flow transition from one time interval to the next while confining the kw. draft on the primary source below the predetermined average kw. demand limitation in each interval, as shown between the first and second fifteen minute intervals in Fig. 5. Then, relay R6 drops out releasing mechanical lock C20. Closing, holding, and releasing of mechanical lock C20 involves relays R6, R7, R8, R1, R2 and R3. Mechanical lock C20 is energized by a circuit formed from line L2 to relay R6 contact 5 to 6 to terminal T12 in Fig. 6 to mechanical lock coil C19 to terminal T13 to line L1. When relay R1 closes and opens normally closed relay R1 contact 7 to 8 after the counterclockwise or return-to-zero movement of flag AX intercepts pick-up coils A2, line L2 supply to electronic chassis E2 and E3 is interrupted. Then, relay R2 contact 1 to 2 puts line L1 on relay r8 closed contact 8 to contact 7 through relay R7 coil to relay R6 closed contact 3 to 2 then line L2, since relay R6 has already been closed after relay R1 was energized. Relay R7 closed contact 6 to 5 puts line L1 on relay R6 contact 9 to contact 8 to relay R6 coil thus providing holding current for relay R6 when relay R1 drops out as it will do either when flag AX moves counterclockwise past pick-up coils A2 or when positioning motor PM1 moves contact arm A8 counterclockwise to its zero position beyond the point where flag AX will have a contact-making effect on A2 pick-up coils (flag AX in its zero position is spaced between arms A3 and A8, as shown by their relative positions in Fig. 6). Flag BX, while being returned counterclockwise to zero by mechanical retainer pin B2 on contact arm B3, continually intercepts pick-up coils B1 back to its zero position whereat it still intercepts the pick-up coils until the next demand period starts. When racks A5 and B5 respectively reach the limit of their up travel with arms A3, A8 and B3 in their zero position, limit switches A9 and B9 open de-energizing relays R4 and R5 which in turn de-energize relays R13 and R14 for stopping and dynamically braking positioning motors PM1 and PM2. This causes electronic chassis E3 to close relay R3 since relays R1 and R4 are open so that relay R3 coil can be energized in the previously described manner through relay R1 contact 7 to 8 and relay R4 contact 4 to 5. Relay R2 coil does not close even though its energizing circuit is set up in like manner since flag AX is still in its zero position not intersecting pick-up coils A1 or A2. Electronic chassis E2 has not yet closed relay R2 and relay R3 therefore closes ahead of relay R2. A circuit is formed from line L1 to relay R3 contact 3 to contact 2 closing relay R3 coil to relay R6 closed contact 3 to 2 to line L2. When relay R2 is closed as the result of the first clockwise movement of flag AX intercepting pick-up coils A1, then relay R7 drops out since relay R2 contact 1 to 2 is opened but relay R8 contact 5 to 6 maintains holding supply current on relay R6 coil. When relay R3 opens (in the next demand billing period after positioning motor PM2 has moved arm B3 clockwise ahead of flag BX), relay R8 drops out also since relay R3 contact 3 to 2 opens. Relay R6 also opens then which de-energizes mechanical lock C20, and another cycle of clockwise movement of meters A and B has begun. If for any reason relay R3 has opened before relay R2 has closed, then relay R2 must close before relay R6 is energized. In other words relay R6 will not be de-energized until both flag AX and arm B3 have moved clockwise in the next demand period. The transition from one time interval to the other has been accomplished without effecting a false adjustment of arms C7 and C8 for controlling the secondary source that would otherwise happen if rod A16 was in an inclined position at the bottom of the stroke and was returned to a true horizontal position on the return cycle when flags AX and BX are returned counterclockwise to zero at the end of the time interval.

*Synchronizing the timing component with the billing demand meter of the primary source*

Timing switch TS in Fig. 6 is a six-pole double throw switch used for synchronizing the timing motor in meter A which is an integral part of this conventional kw. demand meter (similar to that used by public utilities for billing purposes) with the time setting or demand period of the primary source kw. demand billing meter provided and used by the public utility for recording the average kw. demands used by the particular "electric power use-system" to which this control system is applied.

When the timing motor of the present invention is in normal, synchronized operation, switch TS is thrown to the right in the solid line position. This is the position it assumes when the timing component operates in the manner described in detail heretofore. Timing switch TS in Fig. 6 is a six-pole double throw switch. Poles S3 and S6 are the current supply to the phantom load being measured by meter A. Poles S9 and S12 are on the timing motor current supply circuit with the current usually obtained outside of the main circuit breaker on the primary source, as shown at the upper left in Fig. 1, at or near the same point where the utility company's meter is also supplied. Poles S14 and S15 are in the energizing circuit for relay R2 and R3 coils in Fig. 7.

When the timing motor is to be synchronized with the primary source demand billing meter, switch TS is thrown to the left into the dotted line position while flag AX is being returned counterclockwise to the zero position by the timing motor in meter A. Poles S16 and S18 are connected to terminals T29 and T30 in Fig. 7 and serve to short out contacts 909 and 910 in Fig. 11 of relay 906 located on electronic chassis E1 so as to keep relay R1 energized until the switch is thrown to the right back to its normal position. Complete return-to-zero movement of both meters A and B is assured when the switch is thrown to the left since no clockwise movement is permitted until switch TS is thrown to the right. The switch is manually thrown to the right at the moment that the utility company's meter returns its pointer to zero. From then on the two meters will remain in synchronism with each other. Only in the event of energy interruption to one or the other meter must the procedure of synchronizing again be performed. Under normal conditions this will seldom occur.

*Normal control of steam admission to turbines*

The steam flow to the secondary source turbine units No. 1 and No. 2 in Fig. 8 is normally controlled by sermomotors Y and Z controlled by meters D and H respectively. Said meters are normally controlled by one or more positioning motors with each positioning motor being controlled by one or more pressure components responsive to different energy or pressure conditions in the steam flow through the turbines. The present section will describe this normal control for causing the secondary source to generate only "by-product power." Another section entitled "Meter C Takes Over from Normal Steam Flow Control when Undesirable Peaks or Valleys Occur in the Flow from the Primary Source" will describe how the timing component takes over steam flow control from the normal control and alters the steam flow in the secondary source when the predetermined average kw. demand limitation or the predetermined minimum or maximum swing kw. draft limitations are about to be exceeded.

The normal control takes full advantage of "by-product power." In a layout as shown in Fig. 1, the turbine units possess a variance of kw. output ability for a given extraction and exhaust flow of steam that is required for process and heating needs. It is therefore economically important that the turbines be normally loaded sequentially instead of concurrently. In this case only one pressure response component is used which component has steam line U in Figs. 1 and 8. This steam line is connected to the 5# exhaust from turbine unit No. 2. Note that this 5# exhaust is the lowest pressure steam extraction line from this turbine. The load carried by turbine unit No. 2 is that amount that provides enough exhaust steam to maintain 5# pressure in the exhaust line. If full throttle opening fails to provide enough steam to maintain the 5# pressure, then the pressure control component calls upon turbine unit No. 1 to increase its kw. output until its 50# extraction has augmented the 50# extraction of turbine unit No. 2 thereby allowing more steam to flow to its last section BT and thence to the 5# line. Thus it will be observed that turbine unit No. 2 is loaded first and turbine unit No. 1 steps in as turbine unit No. 2 fails to provide the amount of steam required for process needs.

Meter F in Fig. 8 is a fluid pressure gauge connected with steam line U in Fig. 1 from the 5# (p. s. i.) exhaust or stage pressure. This gauge is of the conventional type, shown as 903 in Fig. 9, with pointer shaft extended through the front cover similar to meter shaft 904 and with an arm 91 added, as shown in Fig. 9. The rest of the impulse assembly equipment is as shown in Fig. 9. As variations in pressure in pipe U occur, flag F3 intercepts pick-up coils F7 and F8 mounted respectively on contact arms F1 and F2.

Assuming clockwise movement of flag F3 when there is an increase in pressure, then such pressure increase will cause flag F3 to intercept pick-up coils F7 causing electronic chassis E9 to apply line L2 to relay R24 coil to relay R19 contact 4 to 5 to limit switch G23 for preventing overtravel to line L1, thereby closing relay R24. Relay R24 contact 3 is connected from line L2 to contact 2 to relay R25 coil to line L1 closing relay R25. Line L2 is put on relay R24 contact 9 to 8 to relay R25 contact 6 to 5 to positioning motor PM3 to common return line to line L1 causing rotation of cam shaft G17 in a clockwise direction, assumed for the purposes of disclosure. Rotation of shaft G17 having a cam G18 causes during loading of unit No. 2 movement of compensating rod F5 slidably supported by bearing blocks F6 that rotates contact arm assembly F4 including arms F1 and F2 so as to stop influence of flag F3 on pick-up coils F7 by advancing in a clockwise direction contact arm F1 out of the range of influence from flag F3. Rod F5 is pivotally mounted on contact arm assembly F4. When flag F3 no longer intercepts pick-up coils F7, relay R25 opens. Relay R25 contact 7 and 4 to plate rectifier REC5 provide D. C. current for dynamic braking of positioning motor PM3 when relay R25 opens.

The rotation of cam shaft G17 on which are mounted cams G19 and G22 also causes lengthwise movements of suitably guided push and pull rods G1 and G2 that in turn changes the positions of contact arm assemblies D4 and H4 on meters D and H. Assuming that the allowable pressure variation in meter F produces a 5° change in deflection of flag F3 and that full scale deflection of each meter D or H is 60°, then the G18 cam throw must be such that a 5° movement of contact arm assembly F4 will be obtained with a 60° movement of contact arm assembly H4 or a ratio of 1 to 12. Since both turbine units No. 1 and No. 2 are controlled by this meter F and positioning motor PM3, continued rotation of positioning motor PM3 causes cam G19 to move rod G1 causing meter D to increase output of unit No. 1 causing it to supply 50# steam which in turn reflects a pressure change that ultimately permits regulator Z8 and by-pass Z9 in Fig. 1 to build up 5# steam pressure in unit No. 2. The cam G18 has a constant radius dwell surface engaging rod F5 after unit No. 2 is fully loaded and during the loading of unit No. 1 so that contact arm assembly F4 does not move during loading of unit No. 1 although flag F3 still controls rotation of positioning motor PM3 in responce to variations in pressure in the 5# line. Cams G20 and G21 open and close travel limit switches G24 and G23.

When a decrease in pressure occurs in pipe U to cause a reduction in load on unit No. 2, flag F3 moves counterclockwise. As it does pick-up coils F8 are intercepted by flag F3 causing electronic chassis E8 to apply line L2 to relay R19 coil to relay R24 contact 4 to contact 5 to limit switch G24 for preventing overtravel to line L1 closing relay R19. Line L2 is put on relay R19 contact 3 to 2 to relay R25 coil to line L1 closing relay R25. Line L2 is put on relay R19 contact 9 to contact 8 to relay R25 to contact 9 to contact 3 to positioning motor PM3 to the common return line to line L1 causing the positioning motor to rotate cam shaft G17 counterclockwise for causing movement of rod F5 toward the left by cam G18 that restores or stops influence of flag F3 on pick-up coils F8 by advancing the arm F2 counterclockwise out of the range of influence from flag F3.

Therefore, assuming that positioning motor PM4 is at a central position (Fig. 8) in its range of movement (to be described in more detail later) and therefore reach rods G1 and G2 are at liberty to vary positions of contact arm assemblies D4 and H4 as determined by the position of cams G19 and G22, it will be noted that the fluid pressure in pipe U controls the setting of the contact arm assemblies of meters D and H and normally controls the steam flow to the turbine units No. 1 and No. 2, as will be brought hereinafter.

Referring to meter H in Fig. 8, this instrument is an indicating wattmeter measuring the electrical power output of No. 2 generating unit. Its assembly is as shown in Fig. 9. As the output of No. 2 unit increases, flag H3 moves clockwise and vice versa. As the steam pressure in pipe U drops, cam G22 and rod G2 move contact arm assembly H4 clockwise causing pick-up coils H7 to be intercepted by flag H3. Electronic chassis E6 applies line L2 to relay R17 coil to relay R18 contact 4 to contact 5 to limit switch Z2 for preventing overtravel to line L1 closing relay R17. Line L2 is put on relay R17 contact 3 to contact 2 to relay R22 coil to line L1 closing relay R22. Relay R22 contact 5 is connected from line L2 to contact 6 to servomotor Z to line L1 causing servomotor Z to rotate in a direction that will increase the power output of unit No. 2 by increasing the steam admission to the head end of unit No. 2 and thereby increase the power output causing flag H3 to advance beyond the range of pick-up coils H7.

To reduce the tendency of overshooting by servomotor Z, relay R22 by means of contacts 8 and 9 shorts out RE4 resistance connected in series with the common return in the potential circuit to meter H to momentarily increase the torque produced by the pointer shaft by a small amount causing flag H3 to pull away from pick-up coils H7 when small load changes are required, thereby producing an inching or jogging effect as known to the profession.

Servomotor Z may be an electric motor as here shown or a hydraulic cylinder actuated by oil or similar liquid and by a solenoid operated four-way valve.

When fluid pressure in pipe U increases, a reduction in power output of No. 2 unit is called for. Pressure meter F causes contact arm assembly H4 to be rotated counterclockwise. Flag H3 then intercepts pick-up coils H8 causing electronic chassis E7 to put line L2 on relay R18 coil to relay R17 contact 4 to contact 5 to limit switch Z1 for preventing overtravel to line L1 closing relay R18. Line L2 on relay R18 contact 3 to contact 2 to relay R23 coil to line L1 closes relay R23. Line L2 on relay R23 contact 5 to contact 6 to servomotor Z to common return to line L1 causes servomotor Z to rotate so as to reduce the steam flow to head end and thereby diminish the power output of No. 2 unit.

Relay R23 acts as an inching or jogging relay in a similar manner as relay R22 does when a power increase is sought. In this case relay R23 contacts 7 and 8 open the normal short circuit around resistance RE3 that is also connected in series with common return for the two potential coils in meter H, as is resistance RE4. Thus an inching action is provided for either direction of rotation that allows for the time required by the turbine governor to establish a new position and thereby reducing the possibility of overshooting and consequent hunting.

The control of No. 1 unit has a wattmeter D, servomotor Y, pick-up coils D7 and D8, and electric control circuits and mechanical connections therebetween similar in all details to the corresponding respective wattmeter H, servomotor Z, pick-up coils H7 and H8, and the electric control circuits and mechanical connections therebetween.

The previously mentioned sequential loading of first unit No. 2 and then unit No. 1 is obtained from the design of cams G19 and G22. As mentioned before, positioning motor PM3 rotates far enough to cause cams G22 and G19 to sequentially rotate the contact arm assemblies H4 and D4 respectively a total of 120° (60° each) while the flag F3 and contact arm assembly F4 rotates 5°. Hence, positioning motor PM3 rotates counterclockwise while sequentially loading both units No. 2 and No. 1 from no load up to their full capacity as the pressure decreases in line U causing the flag on meter F to rotate 5° counterclockwise. Cam G22 has a gradually decreasing radial height cam surface as it is rotated counterclockwise for causing rod G2 to be pulled to the left in Fig. 8 while the contact arm assembly H4 is being rotated 60° clockwise to increase steam admission to No. 2 unit from no load to full load. Then, cam G22 has a uniform radius, low height cam dwell type surface for keeping contact assembly H4 rotated clockwise to its full load position as positioning motor PM3 continues to rotate counterclockwise so that No. 2 unit will remain fully loaded as No. 1 unit is sequentially and gradually loaded up to full load. Cam G19 has a cam surface with a radial height increasing in the counterclockwise rotating direction for causing rod G1 to move to the left for rotating contact arm assembly D4 clockwise for gradually increasing steam admission to No. 1 unit with a corresponding increase in output. When the dwell on cam G22 is controlling meter H, the rise on cam G19 is rotating the contact arm on meter D through 60°. As mentioned before, cam G18 moves contact arm assembly F4 only during the changing of load on No. 2 unit but not during the changing of load on No. 1 unit. Hence, cam G18 has a rise and dwell corresponding to that on cam G22. After the dwell on cams G18 and G22 has been reached, the movement of flag F3 between pick-up coils F7 and F8 controls rotation of positioning motor PM3 for changing the load on No. 1 unit. Suitable means is provided where necessary for causing rods G1, G2 and other rods mentioned before and hereinafter to keep in contact with and follow the cam surfaces on their respective cams G19, G22 and other cams mentioned before and hereinafter. This means (not shown) may take the form of the conventional cam track or biasing springs. Therefore, it should be readily apparent that a decrease in pressure in line U will cause unit No. 2 to be gradually loaded up to full capacity and then kept there while unit No. 1 is sequentially and gradually loaded to full capacity until the pressure is sufficiently increased. An increase in pressure will cause a decrease in the loading of unit No. 1 down to no load and then a sequential decrease in the loading of unit No. 2 until the pressure is sufficiently decreased to cause an equilibrium condition in the controls.

In the case of two generating units with one unit supplying extraction or exhaust steam at one pressure and a second unit supplying extraction or exhaust steam at another pressure, it may also be desirable under some circumstances to have two pressure control components, one with a pressure line XX to the 50# pressure in Fig. 1 of unit No. 1 and the other with the pressure line U to the 5# pressure of unit No. 2 with each pressure component controlling its particular turbine unit. With such an arrangement, the loading of each unit will be on the basis of steam demand. Unit No. 1 does the amount of work necessary to maintain 50# extraction pressure while unit No. 2 continues to do the amount of work necessary to satisfy 5# steam demands. Note that steam lines U and XX are connected to the last extraction line of their respective turbines. Each unit tries to operate at full capacity. In this arrangement, meter F has basically the same mechanical and electrical hook-up as before. However, the positioning motor PM3 only rotates far enough counterclockwise, when the pressure in line U drops rotating the flag of meter F 5° counterclockwise, for causing cam G22 to rotate the contact arm assembly H4 clockwise from no load to full load positions and vice versa. No dwell exists on cam G22. Another pressure meter, similar to meter F, with the same kind of mechanical and electrical hook-up is connected to pressure line XX. Its positioning motor, located to the left of positioning motor PM3 in Fig. 8, has a cam for increasing the output of unit No. 1 from no load to full load by pushing rod G1 to the left to rotate contact arm assembly D4 clockwise when the pressure in line XX drops with this pressure drop rotating counterclockwise 5° the flag on its pressure meter and vice versa. No cam G19 is required on positioning motor PM3 responsive to pressure line U for controlling meter D since meter D is now controlled by pressure line XX. Each positioning motor rotates a cam, similar to cam G18, having an increasing height (has no dwell) as the positioning motor rotates in the clockwise direction as pressure increases for moving the pressure meter contact arm assembly in the clockwise pressure increasing direction with said increasing height continuing over the full range of the positioning motor rotation. The yoke G11, to be described in more detail hereinafter, straddles both positioning motors and is connected to rods G1 and G2 in a manner similar to that in Fig. 8.

If by-product fuel or waste heat obtained as cast off of manufacturing operations is used for generating throttle pressure steam, then a pressure component having a steam line X is connected as shown in Fig. 1, to the steam line from the boiler. When a plentiful or excess supply of by-product fuel or waste heat is available, it is indicated by an increase in throttle steam pressure acting on the pressure component. The pressure response unit connected to line X corresponds to the pressure meter F with the same kind of mechanical and electrical hook-up first discussed for pressure line U as giving sequential loading of units No. 2 and No. 1. However, the cam rotated by the positioning motor, corresponding to cam G18, increases in height (has no dwell) over the full range of its positioning motor rotation. Also, in meter F, a decrease in pressure called for an increase in steam admission and electrical output, while in the present arrangement, an increase in pressure calls for an increase in steam admission. Therefore, the cam contours must be different in the two arrangements. In the present arrangement, the cam contours are arranged to fully load both units when by-product fuel supply is high as indicated by the pressure in line X being high, and vice versa. When the supply of by-product fuel is sufficiently high, steam flow to units No. 1 and No. 2 may be even increased to the point of allowing steam to flow through section ET of No. 1 unit to the condenser and/or allowing the pressure in the 5# line of No 2 unit to rise above its normal value causing relief valve V to open enough to exhaust steam to atmosphere through exhaust head W so as to hold steam pressure in the 5# line within limits. Units No. 1 and No. 2 can be sequentially loaded by having a cam dwell surface for keeping one unit fully loaded while the other cam is loading the other unit. The units can be concurrently loaded by having both cams simultaneously load their respective units. The choice between sequential and concurrent loading depends on the relative efficiencies of the two units.

Fig. 12 of the drawings discloses an arrangement wherein a combination of pressure components is used wherein these components have pressure lines U and X in Fig. 1. This is a modification of the control between meters D and H in Fig. 8; however, for clarity, the rods corresponding to rod F5 and the travel limit switches with their associated cams for each positioning motor PM3' and PM3" have been eliminated. Line U, acting on a pressure meter to meter F and having the same kind of mechanical and similar electrical hook-up, causes a positioning motor PM3' to rotate counterclockwise in response to a decrease in pressure in line U to rotate counterclockwise cam G22' to move rod G2 to the left for rotating the contact arm assembly R4 clockwise to increase steam admission to No. 2 unit and vice versa. This positioning motor PM3' has the same kind of mechanical and electrical hook-up as the positioning motor in the 5# U line pressure response component used with the XX line, as described heretofore. Another pressure response component is provided which is similar to the one described in the previous paragraph on by-product fuel or waste heat. In this component, line X, acting on a pressure meter similar to meter F and having the same kind of mechanical and electrical hook-up, causes a positioning motor PM3" to rotate clockwise in response to an increase in pressure to cause cam G22" to slide arm G2" to the left in bearing blocks G30" until it engages stop G13 on rod G2 to pull suitably guided arm G2 to the left for rotating contact arm assembly H4 clockwise to increase steam admission to No. 2 unit and vice versa. This clockwise rotation of positioning motor PM3" also causes cam G19" to push suitably guided arm G1" to the left to rotate contact arm assembly D4 clockwise for increasing steam admission to No. 1 unit and vice versa. Cams G19" and G22" have the proper phase angle therebetween for either sequential or concurrent loading, whichever is desired. With sequential loading, the cam for the first unit loaded must have a dwell cam surface thereon for keeping the first loaded unit fully loaded while the second gradually takes on load. Since it is desirable to take full advantage of by-product fuel or waste heat, when available, spring loaded push and pull telescopic links G4" are stronger than spring loaded push and pull telescopic links G4' so that movement of rod G2" by cam G22" can take over control of the movement of rod G2 from cam G22' for increasing steam admission to units No. 1 and No. 2 whenever there is any conflict between said cams in moving rod G2. Rods G2 and G2" are each made of two relatively lengthwise moving parts joined by spring loaded push and pull telescopic links G4' or G4" connecting these parts in the respective rods for permitting relative movement between the parts.

It should be apparent that, if in the arrangement described in the previous paragraph and shown in Fig. 12, the positioning motor PM3' must control a rod to meter D as well as rod G2 to meter H, the structure controlling rod G2 on the right of positioning motors PM3' and PM3" can be duplicated on the left thereof for controlling meter D.

It should now be apparent that the normal turbine control consists of one or more pressure component controls that can be used singularly or combined in any arrangement for lowest overall cost of operation in controlling any secondary source power plant (1) whether it has one or more turbine units, (2) whether or not it supplies extraction steam, and (3) whether or not by-product fuel or waste heat is used. The normal control causes the turbine units to generate the maximum amount of "by-product power" while satisfying extraction steam needs when either by-product fuel is burned or steam is extracted or both.

It should be clearly understood that this normal control may, in addition to controlling steam admission in response to the pressure or energy conditions in steam turbines as hereinbefore described, may also be used to control other type of equipment for generating electric power by responding to energy conditions at one or more points in said equipment. Other types of equipment for generating electrical power include internal combustion engines, water power, etc. The energy condition may be detected in other manners than by pressure, for example, by temperature, by rate of flow, etc.

*Meter C takes over from normal steam flow control when undesirable peaks or valleys occur in the flow from primary source*

The immediately preceding section tells how steam flow to the turbine or turbines is normally controlled by responses to the energy condition or pressures at different points in the steam flow. However, meter C takes over the control of the steam admission to turbine units No. 1 and No. 2 if (1) the predetermined or given average kw. demand limitation (40 kw. in Fig. 5) is about to be exceeded or (2) the swing peak kw. maximum limitation (70 kw. in Fig. 5) is about to be exceeded or (3) the kw. swing draft on the primary source is falling below the predetermined chosen minimum ("0" kw. in Fig. 5), as mentioned in economy factor No. 4. The secondary source is caused to generate "excess power" in the first and second above situations but is caused to reduce its generation in the third situation.

Electronic pick-up coils C1, C2, C3 and C4 or meter C in Fig. 6 actuate electronic relays 986 on electronic chassis E12, E13, E10 and E11 in Fig. 8 respectively, and they in turn cause rotation of positioning motor PM4 in Fig. 8 either to take over control of the steam admission to turbine units No. 1 and No. 2 from the previously described normal control or to permit the normal control to control steam admission without interference.

It should be noted in Fig. 6 that flags CX and CY, mounted on a common shaft and rotating together, are each shown between their respective pick-up coils for clarity in the drawing. Actually, they have a larger angular spread between them and do not simultaneously assume the position shown in Fig. 6.

For the purpose of a preview explanation, assume that meter C in Fig. 6 has a full load scale deflection of 100 kw. increasing in the clockwise direction; and assume that mechanical limit stop C12 is set at a position that when contact arms C7 and C8 and gear C21 are set back counterclockwise until shoe C11 is resting against stop C12, then any flow in excess of the 40 kw. limitation in Fig. 5 (previously referred to as the predetermined average kw. demand load from the primary source over the demand billing period) through meter C will cause flag CY to intercept pick-up coils C4 causing counterclockwise rotation of positioning motor PM4 in Fig. 8 to call for an increase in electric power generation by the secondary source by generating "excess power" to reduce the load on the primary source. The setting of stop C10 in Fig. 6 is such that when shoe C9 rests against it, a flow in excess of the swing peak 70 kw. limitation in Fig. 5 will cause flag CY to intercept pick-up coils C4 again causing positioning motor PM4 to rotate counterclockwise. These two power values are those previously cited as the predetermined average kw. demand limitation and the maximum momentary or swing peak kw. demand selected as the maximum permissible to be imposed on the primary source. The distance of movement by flag CX between the actuation of pick-up coils C1 and C2 for the sake of illustration may be 10% of scale or 10 kw. while the distance of movement by flag CY between the actuation of pick-up coils C3 and C4 we will assume to be 10 kw. also. As mentioned before, the setting of contact C5 corresponds to the predetermined chosen minimum flow from the primary source ("0" kw. in Fig. 5), as mentioned in economy factor No. 4. Therefore, if movable contact arm assembly C7 and C8 is resting against stop C12, meter C readings of 0, 10 kw., 30 kw., and 40 kw. will cause repositioning of positioning motor PM4 in Fig. 8. On the other hand if the movement of the two kw. demand meters A and B have raised the position of the movable contact arm assembly up to maximum against stop C10, then instrument readings of 0, 10 kw., 60 kw. and 70 kw. would reposition positioning motor PM4 in Fig. 8.

Should the load being measured by meter A be an amount between 10 kw. and 40 kw. in the first case or 10 kw. and 60 kw. in the second case, positioning motor PM4 will rotate to a central position in its range of travel and stop, thereby permitting arms G1 and G2 in Fig. 8 to assume any position that may be called for by the previously described normal steam flow control in response to cam movements on the motor shaft of positioning motor PM3. Thus it will be noted that positioning motor PM4 is arranged to take over the control positions of push and pull rods G1 and G2 as provided for by positioning motor PM3 should power flow from primary source exceed the 40 kw. demand or the 70 kw. swing peak maximum provided for by the setting of stops C12 and C10 or recede below the minimum provided for by the contract settings of contacts C5 and C6 with pick-up coils C1 and C2 in Fig. 6. Rods G1 and G2 are each made of two relatively moving parts joined with spring loaded push and pull telescopic links G3 or G4 connecting these parts for permitting relative endwise movement therebetween without causing mechanical damage when control yoke G11 takes over steam admission control from the normal control.

These responses take place when flag CX (flags CX and CY are mounted on the same shaft and therefore rotate together) intercepts pick-up coils C1 on stationary contact C5 when meter C is indicating the minimum permissible load on the primary source to call for a reduction in secondary source power. Pick-up coils C1 actuate electronic chassis E12 in Fig. 8 closing relay R29 by putting line L2 on relay R30 contact 7 to 8 to relay R29 coil to limit switch G5 to line L1. Relay R26 is closed by a circuit from line L1 to relay R26 coil to relay R29 contact 5 to 6 to line L2. As relay R29 closes it puts line L2 on its contact 3 to contact 2 to relay R31 coil to line L1, and also puts line L2 on relay R29 contact 3 to contact 2 to relay R26 contact 9 to contact 8 to positioning motor PM4 to line L1 causing clockwise rotation of PM4.

Relay R31 is an inching relay. Relay R31 by closing contacts 5 to 6 and 8 to 9 short circuits resistances RE5 and RE7 that are in series with the two potential coils of meter C in Fig. 6 increasing the meter shaft torque a small amount for a given power flow and opening the contact provided by pick-up coils C1 if there is only a small change of position required. This increase in torque provides inching or jogging movements.

If the torque is already zero there would be no effect, which is desirable at this point.

Rotation of positioning motor PM4 clockwise causes motor arm G9 rotated by positioning motor PM4 to push link G10 then control yoke G11 mounted on guide blocks G12 to the right (control yoke G11 is shown in Fig. 8 as being in a central position). As control yoke G11 moves to the right, stops G15 and G14 on arms G1 and G2 respectively are finally engaged to move arms G1 and G2 to the right for causing counterclockwise rotation of contact carrying arms D1, D2 of contact arm assembly D4 and contact carrying arms H1 and H2 of contact arm assembly H4 on meters D and H respectively to reduce the output of secondary source turbine units No. 1 and No. 2. At the extreme length of travel limit switch G5 is opened by motor arm G9 to break the power circuit to positioning motor PM4 stopping its rotation.

When the power measured by meter C in Fig. 6 is 10 kw. or more, pick-up coils C2 on stationary contact C6 are intercepted by flag CX. Pick-up coils C2 in Fig. 6 connected to electronic chassis E13 in Fig. 8 connect line L2 to relay R29 contact 7 to contact 8 to relay R30 coil to limit switch G6 to line L1. Relay R30 then closes causing line L2 to be put on relay R30 contact 3 to contact 2 to relay R32 coil to line L1. Line L2 is put on relay R30 contact 6 to contact 5 to relay R26 coil then to line L1. Relay R32 becomes the inching relay and increases the resistance in the potential circuit of meter C in Fig. 6 by opening the normally closed short circuit around resistances RE6 and RE8 in Fig. 8 and momentarily reducing the shaft torque of meter C that results in the inching or jogging movements, as previously described. Relays R30 and R26 have closed. Line L2 applied on relay R30 contact 3 to contact 2 to relay R26 contact 6 to contact 5 causes positioning motor PM4 to rotate counterclockwise causing link G10 to pull control yoke G11 to the left to a central position, as shown in Fig. 8, if the power measured by meter C in Fig. 6 is in excess of 10 kw. Thus, the normal steam flow control with positioning motor PM3 has again been given control over the positioning of the contact arms on meters D and H.

Relay R26 contacts 4 and 7 to plate rectifier REC4 provides D. C. current for dynamic braking of positioning motor PM4 when relay R26 is de-energized after rotating either clockwise or counterclockwise.

The interception of pick-up coils C3 and C4 by flag CY causes respectively clockwise and counterclockwise rotation of positioning motor PM4. When meter C is registering flow in excess of 40 kw. and up to 70 kw. depending on the position that gear C18 has communicated to gear C21 carrying contact arms C7 and C8, flag CY will intercept pick-up coils C4 causing electronic chassis E11 in Fig. 8 to connect line L2 to relay R27 contact 7 to contact 8 to relay R28 coil to limit switch G8 to line L1, closing relay R28. Line L2 is connected with relay R28 contact 3 to contact 2 to relay R32 coil to line L1, and with relay R28 contact 3 to contact 2 to relay R26 contact 6 (relay R26 has been closed by relay R28 contact 6 from line L2 to contact 5 to relay R26 coil to line L1) to contact 5 to positioning motor PM4 to common return to line L1, causes counterclockwise rotation of positioning motor PM4 to increase the flow from the secondary source by moving reach rods G1 and G2 to the left in Fig. 8 by having control yoke G11 push stops G13 and G16 to the left.

When flag CY intercepts pick-up coils C3 as the power flow from the primary source recedes, the power produced by the secondary source may be reduced, if necessary. As flag CY intercepts pick-up coils C3, electronic chassis E10 puts line L2 on relay R28 contact 7 to contact 8 to relay R27 coil to limit switch G7 to line L1 and relay R27 closes. Line L2 is put on relay R27 contact 3 to contact 2 to relay R31 coil to line L1. Also line L2 is put on relay R27 contact 6 to contact 5 to relay R26 coil to line L1 closing relay R26. Line L2 is put on relay R27 contact 3 to contact 2 to relay R26 to contact 9 to contact 8 to positioning motor PM4 to common return to line L1. Positioning motor PM4 is now caused to rotate clockwise to pull control arm G11 to the right to the central position in Fig. 8.

Relay R26 is the dynamic braking relay for positioning motor PM4 making dynamic braking effective when relay R26 is de-energized. Relays R31 and R32 are inching or jogging relays for positioning motor PM4 when the position change required is small to prevent overshooting. Both of these features have been described before.

It should be clear now that control yoke G11 spans the two reach rods G1 and G2 to exercise ultimate supervisory control over both turbine units No. 1 and No. 2 when the draft on the primary source has undesirable peaks or valleys. When an undesirable peak is about to occur in the flow from the primary source and positioning motor PM4 takes over from the normal steam flow control to cause increase in steam admission even though the extraction pressure in line U or lines U and XX are satisfactory and/or by-product fuel supply does not justify a change in output, as indicated by the pressure in line X. The increased steam flow may cause pressure in the 5# line of unit No. 2 in Fig. 1 to rise above the normal value causing relief valve V to open enough to exhaust steam to atmosphere through exhaust head W so as to hold steam pressure in the 5# line within limits and may cause flow through the section ET of unit No. 1 to the condenser. These later expedients would be the most expensive and therefore allowed to be used only as a last resort in generating "excess power" to limit the undesirable peak in the flow from the primary source. Exhaust of steam to the atmosphere in unit No. 2 and steam flow through section ET to the condenser in unit No. 1 is thus kept at a minimum. These latter expedients generally generate power per kwh. at a higher cost than it can be produced from the primary source while "by-product power" is generally cheaper than purchased power.

Positioning motor PM4 and control yoke C11 take over steam admission control from the normal control if other pressure response components than so far described are used in the normal control. This section so far has described the sequence of operations occurring when control yoke G11 in Fig. 8 takes over from the positioning motor PM3 normally controlling both meters D and H in response to the 5# pressure line U. Central yoke G11 takes over control in the same manner when any one of the following previously described normal steam controls is used instead: (1) pressure lines U and XX are used with two positioning motors each similar to positioning motor PM3 and controlling one of the turbine units, (2) pressure line X is used with only one positioning motor controlling both turbine units, (3) pressure lines U and X are used with the arrangement shown in Fig. 12, or (4) any other combination of pressure response components. All of these have been thoroughly described in the section entitled "Normal Control of Steam Admission to Turbines." It should be noted that each normal control has rods G1 and G2 or their equivalent with each rod being made in two lengthwise relatively moving parts joined with spring loaded push and pull telescopic links G3 or G4 for permitting relative endwise movement so that control yoke G11 can take over without damaging the normal control. Fig. 12 shows the equivalent structure in rods G1″, G2″ and G2 with spring loaded push and pull telescopic links G3″, G4″ and G4′. Rod G1, or its equivalent rod G1″, and rod G2 in each normal control have stops G15, G16 and G13, G14 respectively for coaction with control yoke G11.

On each rod, the spring loaded push and pull telescopic links (not shown) are of conventional construction and consist of two equal width, flat links having their flat surfaces overlapping with one link having its outer end secured to or formed integral with one of the two moving parts composing the rod while the other link is similarly secured to the other rod part. The two links have sidewise aligned, equal length, lengthwise extending, closed end slots therein with one slot in each link. Two carriers travel in said slots and abut opposite ends of a compressed spring located between said carriers and surrounding said links. When the carriers abut against all of the opposite ends of the slots, the links are in their normal position and always assume the same total length between their outer ends under the compression of the spring. However, the outer ends of the links are permitted to move toward or away from each other away from the normal position when sufficient force is applied to them for further compressing the spring when any two, lengthwise spaced, closed slot ends (one on each link) cause the carriers to move toward each other.

Rods G1, G2 or G1″ are so constructed that the cam following end of each rod can reciprocate in a horizontal line in Figs. 8 and 12 while the opposite end that is pivotally mounted respectively to meter contact arm assemblies D4, H4 or D4 can move in an arc. The supporting construction (not shown) for each rod may take the form of the conventional crank and connecting rod with the arm of contact arm assembly D4 or H4 being the crank, the rod G, G2 or G1″ being the connecting rod, and the cam engaging end being the cross head confined to back and forth horizontal motion in Figs. 8 and 12.

It should be clear that control arm G11 in Figs. 8 and 12 would give concurrent loading regulation of turbine units No. 1 and No. 2 when positioning motor PM4 is required to take over control from the normal turbine steam flow controls.

However, it should be readily apparent that if sequential loading of turbine units No. 1 and No. 2 is more economically desirable, this type loading can be provided in either of two ways. First, stops G13, G14, G15 and G16 can be relocated on arms G1 and G2 to give a limited degree of sequential loading of turbine units No. 1 and No. 2. Second, positioning motor PM4 can be provided with a cam shaft having two cams (equal in number to said turbine units) thereon. Control yoke G11 would be made in two separate suitably guided left and right halves with the left half controlled by one cam for movement into engagement with stops G15 and G16 for controlling meter D and turbine unit No. 1 and with the right half controlled by the other cam for movement into engagement with stops G13 and G14 for controlling turbine unit No. 2 by meter H.

The control described in this section will cause control yoke G11 to take over steam flow control from the normal control if (1) the predetermined average kw. demand limitation (40 kw. in Fig. 5) is about to be exceeded or (2) the swing peak kw. maximum limitation (70 kw. in Fig. 5) is about to be exceeded or (3) the kw. swing draft on the primary source is falling below the predetermined chosen minimum ("0" kw. in Fig. 5), as mentioned in economy factor No. 4. In the first and second case, control yoke G11 will cause secondary source turbine units No. 1 and No. 2 to increase their output, while in the third case, yoke G11 will cause them to decrease their output.

If, as mentioned in economy factor No. 7 the public utility permits a higher average kw. demand draft on the primary source without penalty on Sundays, holidays or certain hours of the day or seasonal changes, the control can be quickly adjusted to take advantage of this situation. Only a temporary recalibration of meter B is required by means of step switches B13 and B14 in Fig. 6 on step up current transformer B8 and by means of potential rheostats B11 and B12.

Earned area recording

A further description of control functions concerns the method and means of automatically raising the 40 kw. permissible maximum demand limitation shown in Fig. 5 to higher values until it finally reaches the 70 kw. level as the "earned areas" develop (as shown by earned area "I" in Fig. 5), and also the recording of such "earned areas" after the 40 kw. limitation has been raised to the 70 kw. level (as shown by earned areas "J" and "K" in Fig. 5).

At this point it should be noted in review that the work done by the turbine units is initially that which:

*First.*—Provides maximum use of steam generated with by-product fuel or waste heat at which time the control responds to boiler steam pressure as the indication of degree of available supply of by-product fuel or waste heat. In practice, the substantial supplementation of by-product fuel or waste heat by purchased fuel does not commence until the boiler pressure has dropped a certain amount.

*Second.*—Provides maximum electric power generation from all process and heating steam requirements, when using the turbine units as means for reducing boiler pressure to the optimum pressures of that steam used for process and heating.

These two items together, plus varying manufacturing plant electrical load conditions, can and usually do result in a summation of widely varying characteristics in short intervals of time. It is obvious that the rate of use from the primary source undergoes dips below the 40 kw. (Fig. 5) line hereinbefore referred to, as the predetermined maximum average kw. demand that may be imposed on the primary source for the full demand billing time interval.

As these dips occur, meter B in Fig. 6 travels at a slower rate than yard stick meter A. Consequently arm A16 assumes an inclined position similar to that shown in the dot-dash position instead of a horizontal plane. As it assumes this inclined position, gear C18 rotates gear C21 clockwise causing contact arms C7 and C8 to move up scale on the meter until finally stopped by shoe C9 resting against mechanical limit stop C10. Thus it will be observed that low use of primary source power automatically raises the 40 kw. demand limit until it finally is stopped when it reaches the 70 kw. level that was selected as a top kw. swing peak limit that may be imposed on the primary source regardless of earned areas that may have accrued. Raising the limit from 40 kw. to 70 kw. has recorded earned area "I" in Fig. 5. During this time the turbine units are carrying loads as dictated by "by-product power" availability while the remainder of the power needed may be furnished by the primary source, if necessary.

When shoe C9 comes to rest against stop C10, the 70 kw. level is reached and earned areas "K" and "J" in Fig. 5 are recorded if the condition continues. When shoe C9 came to rest against stop C10, it also opened switch C14 connected to terminals T14 and T15 in Fig. 7. Thus the flow of current from relay R9 contact 8 to relay R10 contact 8 in Fig. 7 is interrupted. The previous condition (the first stopping manner described in the section entitled "Timing Component") where positioning motors PM1 and PM2 can only start together and yet can stop independently of each other is changed. They must still start together but the stopping of positioning motor PM2 also stops positioning motor PM1. However, the stopping of positioning motor PM1 cannot stop positioning motor PM2. Their stopping now follows the second stopping manner described in the "Timing Component" section. Flag AX continues to advance clockwise through pick-up coils A1 since there is no mechanical interference by the pick-up coils and since meter A is rotating at a constant rate of movement. The distance flag AX passes on through pick-up coils A1 is a measure of the earned area shown by earned areas "J" and "K."

The operation of recording the earned area may be summarized. When the rate of power use from the primary source drops below the 40 kw. line in Fig. 5, the 40 kw. limitation is automatically increased to a greater value in like proportion as shown in the dotted triangle earned area space "I" in Fig. 5, until it reaches the 70 kw. level. The unbalance or inclination of rod A16 in Fig. 6 is a measure of the earned area between 40 and 70 kw. At that time positioning motor PM1 is stopped when positioning motor PM2 stops, and consequently flag AX advances on through pick-up coils A1. The distance that the leading edge of flag AX passes beyond the impulse pick-up point of pick-up coils A1 becomes a measure of "earned area" shown in the rectangular space "J" plus "K" that follows the triangular space. It should be noted that this latter earned area is recorded without causing further unbalance of rod A16 in Fig. 6. Since the flag AX must always intercept pick-up coils A1 even when it is recording earned area, the distal end of flag AX must of necessity have a long arcuate length. The sum of the three areas becomes the total "earned area" that must be balanced out before the turbines will increase their output to give "excess power" (shaded area in Fig. 4) above and beyond that available from "by-product power" steam supply, unless there be a momentary or swing peak demand that exceeds the 70 kw. swing peak limit. Thus it will be noted that "low-use" valleys are taken advantage of by permitting subsequent "high-use" peaks during the same demand billing period in which the momentary kw. draft during said "high-use" peaks exceeds said predetermined average kw. demand value to lie between 40 kw. and 70 kw. in Fig. 5. This results in a higher than normal load-factor that materially affects the unit cost per kwh. obtained from the primary source. Condenser exhaust or atmospheric exhaust is also kept at a minimum which likewise affects the monthly fuel cost.

From the foregoing it will be observed that, in a broad sense, the timing component regulates the rate of electric power generation of the secondary source only when the average kw. demand rate of flow from the primary source, during the same time interval as used by the public utility for demand billing purposes, is about to exceed a predetermined permissible value, given as 40 kw. in Fig. 5. Other than that, its function is to record the blocks of "low-use" primary source power, and at the same time raise by like amount the maximum kw. limit in terms of permissible momentary peaks, as distinguished from the average demand, to a top fixed limitation (shown as 70 kw. in Fig. 5) that is usually established by the primary source sub-station capacity limit. If subsequent "high use" blocks of power occur, it then reverses the foregoing by reducing the maximum momentary kw. limitation in amounts equivalent to that of "high use" blocks until finally restoring the kw. swing peak limitation to the fixed value chosen as the permissible maximum average kw. demand value (40 kw. in Fig. 5) for the full time interval.

When power is being obtained from the primary source from the beginning of the demand period at a kw. rate numerically equal to or greater than the predetermined average kw. demand over the billing period, as shown in the first three minutes at the left end of Fig. 5, no earned area is being recorded. Meter B in Fig. 6 is moving as fast as meter A. Then, shoe C11 of meter C comes to rest against stop C12 which opens switch C13. Opening the contacts of switch C13 provides a signal to the station operator of a maximum condition that requires attention such as adding another generator to the secondary source. A circuit from a suitable signal can be connected to terminals T40 and T41 in Fig. 6. Attention is especially required if switch C13 is frequently or always open. If meter B rotates faster than meter A when switch C13 is open, no damage will occur since meter shaft 904 in Fig. 9, being frictionally driven by meter B, will slip since pin B3 prevents further clockwise movement of flag BX.

This control tends to assist the power company in maintaining contant voltage on its system by varying the permissible demands on the primary source. It should be noted that meter A is responsive to variations in line voltage from the primary source. A drop in line voltage will cause a reduction in phantom load to meter A with a corresponding slow-up in the speed of rotation of flag AX. Then, flag AX will move over a smaller arcuate length during that demand billing time interval so that the predetermined average kw. demand limitation is reduced during that time interval below the 40 kw. limitation in Fig. 5. However, the flag BX of meter B does not slow up but continues to rotate at the same rate because the load or "electric power use-system" still demands the same amount of power; the decrease in line voltage will cause a proportionate increase in ampere flow from the primary source to the load. Hence, the secondary source may be required to take over a greater portion of the load since the predetermined average kw. demand value has been reduced over the demand billing period. The control tends to assist the power company in maintaining constant voltage on its system by reducing the permissible demand load that can be imposed thereon when the voltage drops.

As mentioned before, some utilities charge on the average kva. demand basis instead of the kw. basis. The control has been described on the kw. basis. If the kva. basis is used, it is merely necessary to change meters B and C to the volt-ampere type instead of the kw. type.

Various changes in details and arrangement of parts can be made by one skilled in the art without departing from the spirit of this invention or the scope of the appended claims.

Definitions of terms

Here are definitions of some terms used in this specification and in the appended claims.

*Primary source.*—That source from which a portion of the electric power needs are obtained, as for example a public utility or the equivalent thereof, which by its size or capacity maintains a command of the electrical frequency, and whose rate of supply is uncontrollable at the point of use (except as indicated in the following definition paragraph entitled secondary source).

The supplier of this power, usually charges for service, first on the basis of so-called maximum demand and secondly for the units of energy used in terms of kilowatt or kilovolt ampere hours.

The so-called demand charge is based on the highest average kilowatt or kilovolt ampere load imposed on said source during any demand billing time interval (the present popular time intervals being of 15, 30 or 60 minute duration) that occurs during the current billing period. From this it is clearly apparent that the control response should be responsive to the same timed demand factors (over the same demand billing time interval) as used for billing purposes in charging for services obtained from the primary source.

*Secondary source.*—That source from which a portion of the electric power needs are obtained comprising the privately owned electric power generating facilities with or without heat energy supply for process and heating. The output of electric power of the secondary source is controllable by this invention, and since both the primary and secondary sources operate in parallel, feeding a single "electric power use-system," then any increase or decrease in electric power out-put of the secondary source, with a given demand from the "electric power use-system" will cause an equivalent inverse rate of flow of electric power from the primary source.

The rate of electric power generation by the secondary source is chiefly controlled by the rate of demand for process and heating energy called for by the "heat energy use-system," and/or the degree of availability of heat energy obtained from by-product fuel or waste heat resulting from cast-off manufacturing operations that is used to generate throttle pressure steam that in turn is used for electric power generation. This is "by-product power."

The turbine controlling impulse that responds to "heat energy use-system" demands become subservient to the primary source predetermined maximum and minimum swing peak limitations and predetermined average demand limitations if they be exceeded.

*"Electric power use-system."*—The plant load connected in parallel with the primary and secondary electric power sources.

*"Heat energy use-system."*—Comprises that portion of the power plant and manufacturing plant installation, that requires steam at lower pressure than that supplied to the throttle of the secondary source electric generating units and therefore obtainable from the exhaust or extraction openings or the engines or turbines.

*Kw. or kva. demand load.*—The terms kw. and kva. are equal in value if the power factor is unity. This seldom occurs. Some utilities use average kw. over a demand billing period as a basis of demand charge while others use kva. The same measuring instrument may be used in either case, except that when kva. is used a small auto-transformer is connected into the potential leads going to the instrument that in turn alters the phase angle.

*"By-product power."*—The term as herein used is that electric power generated when using the engines or turbines as a means of reducing boiler or throttle pressure to suitable levels for process or heating steam needs herein termed as the "heat energy use-system." It also includes the electric power made available by using by-product fuel or waste heat to generate boiler or throttle pressure steam that in turn is used to generate electric power.

*"Excess power."*—That increment of electric power generated in excess of that available from by-product power.

*"Earned areas" or low-use.*—Those blocks of electric power generated by the secondary source that cause the draft from the primary to recede below the predetermined permissible maximum average kw. or kva. demand level (40 kw. in Fig. 5) as shown in Fig. 5. It is that area in Fig. 5 below the 40 kw. line and above the actual primary source use line.

*High-use.*—Those blocks of electric power obtained from the primary source and being above the 40 kw. line in Fig. 5 while below the primary source use line. These high-use blocks above the predetermined average kw. or kva. demand (40 kw.) can take place without exceeding said predetermined average since an equivalent "earned area" existed previously.

*"Heat rate."*—Refers to the amount or number of B. t. u. used or expended to generate one kwh. In terms of purchased fuel it could be said that the heat per kwh. when all throttle steam is derived from by-product fuel or waste heat is zero, whether it be extraction or exhaust steam used to supply the demands for the "heat energy use-system." When purchased fuel is used for generating all throttle steam and all exhaust or extraction steam is used by the "heat energy use-system" the heat rate per kwh. is approximately 4000 B. t. u. The heat rate per kwh. when all throttle flow is finally exhausted to the condenser depends on the available heat drop from initial to exhaust. For most industrial plants it would be approximately 15,000 B. t. u. or more. When exhausting to atmosphere it would be approximately 26,000 B. t. u. or more.

From the foregoing it is clear that the sequence of loading as provided for by this invention takes into account the relative thermal efficiencies in terms of B. t. u. per kwh.

"*Load factor.*"—This applies to the primary source power, and is the mathematical ratio of total kwh. used in a given billing period to the product of the average maximum kw. or kva. demand used by the utility for billing purposes and of the number of hours in said billing period.

What I claim is:

1. Apparatus for controlling electric power derived from two sources, comprising means sensitive to the electric power derived from one source and arranged to cause an increasing draft upon said one source to be limited to a predetermined average kw. or kva. demand flow over a given time interval and additional draft above said maximum to be met with a supply from the other source.

2. A system for controlling the supply of electrical power to a plant from a primary source, including a secondary source of electrical and heat energy, and control means therefor responsive to the relative demands of the plant for electrical and heat energy for limiting the supply of electrical energy from said primary source to a predetermined average kw. or kva. demand flow over a given time interval.

3. Apparatus of the character described, comprising a first source of electric energy, a generator of both heat energy and electric energy as a secondary source, and relay control means therefor, said relay control means including both means sensitive to the heat energy drawn from said generator and effective upon said generator to increase or decrease its electric energy output and means sensitive to the electric energy drawn from said first source and effective upon said generator to increase its output when the draft on said first source exceeds a predetermined average kw. or kva. demand flow over a given time interval.

4. Apparatus of the character described in claim 3 and including means for also confining the electric draft upon said source between predetermined maximum and minimum kw. or kva. limits above and below the numerical value of said average kw. or kva. demand flow provided that said average over the time interval is not exceeded.

5. Apparatus of the character described, comprising a source of electric energy, a generator of both electric and heat energy with the electric energy from said source and generator connected to a common load, control means therefor, including means sensitive to the heat energy drawn from the generator and to the electric energy drawn from said source and effective upon said generator to vary its electric energy output, and means for confining the total electric draft upon said source between a predetermined average kw. or kva. demand limit over a given time interval and a minimum kw. or kva. limit by increasing or decreasing the electrical output of said generator.

6. A system for controlling the supplies of electric and heat energy to a plant where the electric demand always exceeds a minimum finite value, including an outside primary source of electrical energy capable at all times of supplying energy in excess of a given value and unavailable for control of its output, an inside secondary source of heat energy and electric energy, and control means responsive to the total plant demand for both heat and electric energy and arranged to confine the supply of electric energy from the outside source between a predetermined minimum kw. or kva. value and a predetermined maximum average kw. or kva. demand load value over a given time period.

7. An electric power system, comprising a primary source of electric power, a secondary electric power source wherein both sources are connected to a common load, and a control means for said secondary power source responsive to the electric power flow from said primary source for confining the total electric draft upon said primary source below an average kw. or kva. demand load over a given time interval.

8. An electric power system, comprising a primary source of electric power, a secondary electric power source wherein both sources are connected in parallel to a common load, and a control means for said secondary power source responsive to the electric power flow from said primary source for allowing the kw. or kva. draft upon said primary source to go above and below a given kw. or kva. amount while confining the electric draft upon said primary source below a predetermined average kw. or kva. demand load over a given time interval wherein said given amount and predetermined load are numerically equal.

9. An electric power system, comprising a primary source of purchased electric power, a secondary electric power source wherein both sources are connected to a common load, and a control means for said secondary power source responsive to the electric power flow from said primary source for confining the total electric draft upon said primary source below a predetermined average kw. or kva. demand load for a given period substantially corresponding to the billing period of said primary source.

10. An electric power system, comprising a primary source of electric power, a secondary electric power source wherein both sources are connected to a common load, and a control means for said secondary power source responsive to the electric power flow from said primary source for confining the total electric draft upon said primary source below a predetermined average kw. or kva. demand load for a given period, and means responsive to the electric power flow from the primary source for confining the flow therefrom between predetermined upper and lower kw. or kva. limits above and below said predetermined average kw. or kva. amount.

11. Control apparatus for keeping the flow of power from a primary source to a load for a given period below a given average amount, said control apparatus comprising a means responsive to the draft on said primary source for causing a secondary power source to furnish power to said load when the draft on the primary source exceeds said given average amount.

12. Control apparatus for keeping the flow of electric power from a primary source to a load below a given average kw. or kva. rate for a given time period, said control apparatus comprising a means for measuring proportionally to the total kwh. or kvah. flowing from said primary source from the beginning of the time period, a yard stick means moving at a constant rate corresponding to the measuring of said first means if said given average kw. or kva. were being used at a uniform rate from the beginning of the time period, and control means responsive to the unbalance between said first and second mentioned means for causing a secondary power source to furnish power to said load when the total on said first mentioned means is greater than on said yard stick means.

13. Control apparatus for keeping the flow of electric power from a primary source to a load below a given average kw. or kva. rate for a given time period, said control apparatus comprising a means for measuring proportionally to the total kwh. or kvah. flowing from said primary source from the beginning of the time period, a yard stick means moving at a constant rate corresponding to the measuring of said first means if said given average kw. or kva. were being used at a uniform rate from the beginning of the time period, and control means responsive to the unbalance between said first and second mentioned means for causing a secondary power source to furnish power to said load when the draft on the primary source exceeds the given average kw. or kva. rate.

14. Control apparatus for keeping the flow of electric power from a primary source to a load below a given average kw. or kva. rate for a given time period, said control apparatus comprising a means for measuring proportionally to the total kwh. or kvah. flowing from said primary source from the beginning of the time period, a yard stick means moving at a constant rate corresponding to the measuring of said first means if said given average kw. or kva. were being used at a uniform rate from the beginning of the time period, and control means responsive to the unbalance between said first and second mentioned means for causing a secondary power source to furnish power to said load when the draft on the primary source exceeds the given average kw. or kva. rate while allowing kw. or kva. draft on said primary source to exceed the numerical value of said given average if said given average has not been exceeded since the beginning of the time period.

15. Control apparatus for keeping the flow of electric power from a primary source to a load below a given average kw. or kva. amount over a given time period, said control apparatus comprising a first means for measuring an adopted standard rate of uniform flow for said given time period, a second means for measuring proportionally to the total kwh. or kvah. flow from the beginning of said given time period from said primary source, and means responsive to the unbalance between said first and second means for causing a secondary source to furnish power to the load when an unbalance occurs.

16. Control apparatus for keeping the flow of electric power from a primary source to a load below a given average kw. or kva. amount over a given time period, said control apparatus comprising a first means for measuring an adopted standard rate of uniform flow for said given time period, a second means for measuring proportionally to the total kwh. or kvah. flow from the beginning of said given time period from said primary source, and means responsive to the unbalance between said first and second means for causing a secondary source to furnish power to the load when an unbalance occurs with said second means measuring a greater value than said first means.

17. Control apparatus for keeping the flow of electric power from a primary source to a load below a given average kw. or kva. amount over a given time period, said control apparatus comprising a first means for measuring an adopted standard rate of uniform flow for said given time period, a second means for measuring proportionally to the total kwh. or kvah. flow from the beginning of said given time period from said primary source, and means responsive to the unbalance between said first and second means for causing a secondary source to furnish power to the load when an unbalance occurs for restoring balance between said first and second means, and means for measuring the kw. or kva. flow from said primary source for causing said secondary source to furnish power to the load when the flow from said primary source exceeds a predetermined maximum.

18. Control apparatus for keeping the flow of electric power from a primary source to a load below a given average kw. or kva. amount over a given time period, said control apparatus comprising a first means for measuring an adopted standard rate of uniform flow for said given time period, a second means for measuring proportionally to the total kwh. or kvah. flow from the beginning of said given time period from said primary source, and means responsive to the unbalance between said first and second means for causing a secondary source to furnish power to the load when an unbalance occurs and for measuring the kw. or kva. flow from said primary source for causing said secondary source to furnish power to the load when the flow from said primary source exceeds a predetermined maximum or for causing said secondary source to reduce the amount of power it supplies to the load when the flow from said primary source falls below a predetermined minimum.

19. Control apparatus for keeping the flow of electric power from a primary source to a load below a predetermined average kw. or kva. flow over a given time interval and for keeping the flow below a given kw. or kva. maximum numerically greater than said predetermined average kw. or kva. amount, said control apparatus comprising a yard stick means for measuring total flow equivalent to said predetermined average kw. or kva. amount uniformly used from the beginning of the given time interval, a meter for measuring proportionally to the total kwh. or kvah. flow from said primary source from the beginning of the given time interval, and control means responsive to the unbalance between said yard stick means and said meter when said meter tries to get ahead of said yard stick means for causing a secondary source to furnish power to the load when said aforementioned unbalance occurs indicating that said predetermined average kw. or kva. amount is about to be exceeded from the beginning of the given time interval, said control means including means responsive to the kw. or kva. draft upon the primary source and said unbalance for increasing the upper limit of permissible kw. or kva. flow from said primary source from said predetermined average kw. or kva. amount to said given kw. or kva. maximum amount before said secondary source furnishes power to the load as said yard stick means gets in unbalance ahead of said meter as a measuring of the earned area during low-use, whereby said earned area enables said meter to move at a faster rate than said yard stick means later in the time interval during high-use at a rate between said predetermined average kw. or kva. and said given kw. or kva. maximum amount without having the draft on the primary source exceed said predetermined average kw. or kva. amount over the given time period.

20. Control apparatus for keeping the flow of electric power from a primary source to a load below a predetermined average kw. or kva. flow over a given time interval and for keeping the flow below a given kw. or kva. maximum numerically greater than said predetermined average kw. or kva. amount, said control apparatus comprising a yard stick means for measuring total flow equivalent to said predetermined average kw. or kva. amount uniformly used from the beginning of the given time interval, a meter for measuring proportionally to the total kwh. or kvah. flow from said primary source from the beginning of the given time interval, and control means responsive to the unbalance between said yard stick means and said meter when said meter tries to get ahead of said yard stick means for causing a secondary source to furnish power to the load when said aforementioned unbalance occurs indicating that said predetermined average kw. or kva. amount is about to be exceeded from the beginning of the given time interval, said control means including means responsive to the kw. or kva. draft upon the primary source and said unbalance for increasing the upper limit of permissible kw. or kva. flow from said primary source from said predetermined average kw. or kva. amount to said given kw. or kva. maximum amount before said secondary source furnishes power to the load as said yard stick means gets in unbalance ahead of said meter as a measure of the earned area during low-use, and said control means including means activated when the permissible kw. or kva. flow from said primary source reaches said given kw. or kva. maximum for allowing said yard stick means to get ahead of said meter without causing further unbalance for recording additional earned area, whereby said earned area enables said meter to move at a faster rate than said yard stick means later in the time interval during high-use at a rate between said predetermined average kw. or kva. and said given kw. or kva. maximum amount without having the draft on the primary source exceed said predetermined average kw. or kva. amount over the given time period.

21. An electric power system, comprising a kw. or kva. demand meter measuring the maximum average kw. or kva. flowing from a primary electrical source to a load for a given time interval, a power control substantially synchronized with said demand meter to operate over substantially the same given time interval and responsive to the kwh. or kvah. draft on said primary source for confining the total electric draft upon said primary source below a predetermined average kw. or kva. demand over said given time interval by causing a secondary electric power source to supply electric power to the load when said predetermined average demand flow is exceeded.

22. An electric power system, comprising a kw. or kva. demand meter measuring the maximum average kw. or kva. flowing from a primary electrical source to a load for a given time interval, a power control substantially synchronized with said demand meter to operate over substantially the same given time interval and responsive to the kwh. or kvah. draft on said primary source for confining the total electric draft upon said primary source below a predetermined average kw. or kva. demand over said given time interval by causing a secondary electric power source to supply electric power to the load when said predetermined average demand is exceeded, said power control including means for maintaining a smooth power flow transition from one time interval to the next.

23. An electric power system, comprising a kw. or kva. demand meter measuring the maximum average kw. or kva. flowing from a primary electrical source to a load for a given time interval, a power control substantially synchronized with said demand meter to operate over substantially the same given time interval and responsive to the kwh. or kvah. draft on said primary source for confining the total electric draft upon said primary source below a predetermined average kw. or kva. demand over said given time interval by causing a secondary electric power source to supply electric power to the load when said predetermined average demand is exceeded while allowing the kw. or kva. draft upon said primary source to go above and below said predetermined average amount.

24. Control apparatus for keeping the flow of power from a primary source to a load below a predetermined average kw. or kva. demand amount over a given period, said control apparatus comprising a means for measuring proportionally to the total kwh. or kvah. flowing from said primary source from the beginning of said period, a yard stick means moving at a constant rate corresponding to the measuring of said first means if said predetermined average kw. or kva. were being used at a uniform rate since the beginning of the period, control means for the primary source responsive to the unbalance between said first and second mentioned means for causing a secondary power source to furnish power to said load when the total on said first mentioned means is greater than said yardstick means, and means for returning at the end of said period said first mentioned means and said yardstick means to their starting position at the beginning of said period.

25. Control apparatus for keeping the flow of electric power from a primary source to a load below a predetermined average kw. or kva. amount over a given demand billing period, said control apparatus comprising means responsive to the draft on said primary source for confining the total electric draft upon said primary source below a predetermined average kw. or kva. demand load over a given demand billing time interval by causing a secondary power source to furnish power to said load when the draft on the primary source exceeds said predetermined average amount over said given demand billing time interval, said control apparatus including means for returning said first mentioned means to a zero position at the end of the demand billing time interval.

26. A power control system, comprising a primary source of purchased electrical power with the purchase price including a kwh. or kvah. charge and including an average kw. or kva. demand charge over a given demand billing period, a secondary source of electrical power connected to a common load and including a first means for producing electrical power cheaper per kwh. or kvah. than said purchased power and including a second means for producing electrical power at a higher cost per kwh. or kvah. than the purchased power, control means for supplying said load with the entire electrical power of said first means to said load before said primary source supplies power above a predetermined minimum kw. or kva., and control means responsive to the power draft on said primary source for confining the total electrical draft upon said primary source below a predetermined average kw. or kva. demand for the demand charge billing period and for shifting any additional load onto said second means.

27. A power control system, comprising a primary source of purchased electrical power with the purchase price including a kwh. or kvah. charge and including an average kw. or kva. demand charge over a given demand billing period, a secondary source of electrical power connected to a common load and including a first means for producing electrical power cheaper per kwh. or kvah. than said purchased power and including a second means for producing electrical power at a higher cost per kwh. or kvah. than the purchased power, control means for supplying said load with the entire electrical power of said first means to said load before said primary source supplies power above a predetermined minimum kw. or kva., and control means responsive to the power draft on said primary source for confining the total electrical draft upon said primary source below a predetermined average kw. or kva. demand for the demand charge billing period and for shifting any additional load onto said second means while allowing the kw. or kva. draft on said primary source to go above said average kw. or kva. amount as long as said average kw. or kva. is not exceeded over the demand billing period.

28. A power system for connection to a primary energy source of electrical power, comprising a secondary energy source including a secondary source of electrical power for connection to a common load with said primary source wherein said secondary source of electrical power includes by-product power and excess power, control means responsive to the energy generating said by-product power for causing the load to get first the by-product power before the power from the primary source, and control means responsive to the draft upon said primary source for confining the total electrical draft upon said primary source below a predetermined average kw. or kva. demand load for a given period and for transferring any load above said average demand to said excess power of said secondary source.

29. A power system for connection to a primary energy source of electrical power, comprising a secondary energy source including a secondary source of electrical power for connection to a common load with said primary source wherein said secondary source of electrical power includes by-product power and excess power, control means responsive to the energy generating said by-product power for causing the load to get first the by-product power before the power from the primary source if the draft on the primary source is above a predetermined minimum, and control means responsive to the draft upon said primary source for confining the total electrical draft upon said primary source below a predetermined average kw. or kva. demand load for a given period and for transferring any load above said average demand to said excess power of said secondary source.

30. In a power system with a primary energy source of electrical power and a secondary energy source including a secondary source of electrical power with both electrical power sources connected to a common load, control means responsive to the energy condition of said secondary source for normally controlling said secondary energy source, and control means for said secondary energy source responsive to the electrical draft on said primary source for causing said secondary source to increase its electrical power generation so that the total electrical draft upon said primary source is confined below a predetermined average kw. or kva. demand load over a given time interval.

31. In a power system with a primary energy source of electrical power and a secondary energy source including a secondary source of electrical power with both electrical power sources connected to a common load, means for controlling the electrical power output of said secondary energy source, control means responsive to the energy condition of said secondary source for normally controlling said first mentioned means, and control means for said first mentioned means for taking over control from said second mentioned means and responsive to the electrical draft on said primary source for causing said secondary source to increase its electrical power generation so that the total electrical draft upon said primary source is confined below a predetermined average kw. or kva. demand load over a given time interval.

32. In a power system with a primary energy source of electrical power and a secondary energy source including a secondary source of electrical power with both electrical power sources connected to a common load, means for controlling the electrical power output of said secondary energy source, control means responsive to the energy condition of said secondary source for normally controlling said first mentioned means, and control means for said first mentioned means taking over control from said second mentioned means and responsive to the electrical draft on said primary source for causing said secondary source to increase its electrical power generation so that the total electrical draft upon said primary source is confined below a predetermined average kw. or kva. demand load over a given time interval even though the kw. or kva. draft upon said primary source goes above or below said average kw. or kva. amount and for causing said secondary electric power source to reduce or to increase its electrical power output when the draft on said primary source respectively falls below a given kw. or kva. minimum or exceeds a given kw. or kva. maximum.

33. Apparatus for controlling electric power derived from two sources connected in parallel to a common load, comprising control means responsive to the electric draft on one source for limiting said draft to a predetermined average kw. or kva. demand load over a given time period by causing said other source to supply additional power to said load, said control means including means for time integrated recording of low-use of power from said one source below said predetermined average kw. or kva. demand amount so that high-use of power from said one source above said predetermined average kw. or kva. can take place during subsequent moments of the time interval up to the amount recorded during low-use without exceeding said predetermined average kw. or kva. demand load over the given time period.

34. A primary source of electric power operating in parallel with a secondary source of electric power obtained from both sources used by a common "electric power use-system," a "heat energy use-system" supplied only by the secondary source, control means for varying the secondary source electric power generation so that exhaust or extraction heat energy obtained as a result of generating electric power is in sufficient amount to meet the demands for heat energy by the "heat enery use-system" provided that the electric power rate of flow from the primary source at that moment lies between chosen predetermined maximum and minimum limits in kw. or kva. momentary swing peaks and below a predetermined average kw. or kva. demand limit for a given time period so that when such limits are about to be exceeded the secondary source electric power generation will vary its electric power output regardless of demands for heat energy by the "heat energy use-system" and thereby cause primary source rate of electric power flow to be retained within said predetermined limits.

35. A power system for connection to a primary energy source of electrical power, comprising a secondary energy source having turbines or engines and including a secondary source of process and heating steam and of electrical power for connection to a common load with said primary source wherein said secondary source of electrical power includes by-product power and excess power, said by-product power being generated while using the turbines or engines as means for reducing throttle pressure steam to the required pressures to be obtained from exhaust or extraction supply points for process and heating needs, control means responsive to the exhaust or extraction steam pressure for causing said secondary source to satisfy only exhaust or extraction steam needs while generating by-product power for said load with the balance of the power for said load being obtained from said primary source, and control means responsive to the draft upon said primary source for confining the total electrical draft upon said primary source below a predetermined average kw. or kva. demand load for a given period and for transferring any load above said average demand to said excess power of said secondary source.

36. A power system for connection to a primary energy source of electrical power, comprising a secondary energy source receiving energy from waste heat and from other energy containing material including a secondary source of electrical power output for connection to a common load with said primary source wherein said secondary source of electrical power includes by-product power generated by said waste heat and excess power generated by said other energy containing material, control means responsive to the supply of waste heat for causing said secondary source to increase its output in direct proportion to supply of available waste heat, if the draft on the primary source is above a predetermined minimum, and control means responsive to the draft upon said primary source for confining the total electrical draft upon said primary source below a predetermined average kw. or kva. demand load for a given period and for transferring any load above said average demand to said excess power of said secondary source.

37. Control apparatus for keeping the flow of electric power from a pirmary source to a load below a given average kw. or kva. rate for a given time period, said control apparatus comprising a means for measuring proportionally to the total kwh. or kvah. flowing from said primary source from the beginning of the time period, a yard stick means responsive to the voltage of the flow from the primary source and moving at a constant rate as long as said voltage remains constant corresponding to the measuring of said first means if said given average kw. or kva. were being used at a uniform rate from the beginning of the time period, and control means responsive to the unbalance between said first and second mentioned means for causing a secondary power source to furnish power to said load when said given average kw. or kva. amount is about to be exceeded, said given average amount being reduced when voltage drops so that the demands on said primary source are reduced.

FRANK O. WALLENE.

References Cited in the file of this patent

UNITED STATES PATENTS

| Number | Name | Date |
|---|---|---|
| 1,670,070 | Holt | May 15, 1928 |
| 1,759,763 | Standerwick | May 20, 1930 |
| 1,780,691 | Warren | Nov. 4, 1930 |
| 1,822,071 | Wallene | Sept. 8, 1931 |
| 1,841,425 | Taylor | Jan. 19, 1932 |
| 1,896,356 | Gay | Feb. 7, 1933 |
| 1,984,187 | Hayward et al. | Dec. 11, 1934 |
| 2,039,426 | Kerr | May 5, 1936 |
| 2,050,338 | Kerr | Aug. 11, 1936 |
| 2,144,550 | Sheppard | Jan. 17, 1939 |
| 2,165,175 | Dickey et al. | July 4, 1939 |
| 2,167,469 | Wallin | July 25, 1939 |
| 2,201,239 | Margolis | May 21, 1940 |
| 2,262,558 | Schwendner | Nov. 11, 1941 |
| 2,262,561 | Schwendner | Nov. 11, 1941 |
| 2,366,968 | Kaufman | June 9, 1945 |

FOREIGN PATENTS

| Number | Country | Date |
|---|---|---|
| 292,980 | Great Britain | Nov. 15, 1928 |